United States Patent
Fujinami

(10) Patent No.: US 7,664,951 B2
(45) Date of Patent: Feb. 16, 2010

(54) TRANSMITTING APPARATUS FOR PROVIDING INFORMATION BY EFFECTIVE USE OF BANDS

(75) Inventor: Yasushi Fujinami, Kanagawa (JP)

(73) Assignee: Sony Corporation, Tokyo (JP)

( * ) Notice: Subject to any disclaimer, the term of this patent is extended or adjusted under 35 U.S.C. 154(b) by 781 days.

(21) Appl. No.: 10/258,333

(22) PCT Filed: Feb. 21, 2002

(86) PCT No.: PCT/JP02/01544

§ 371 (c)(1),
(2), (4) Date: Apr. 1, 2003

(87) PCT Pub. No.: WO02/067586

PCT Pub. Date: Aug. 29, 2002

(65) Prior Publication Data

US 2003/0171095 A1        Sep. 11, 2003

(30) Foreign Application Priority Data

Feb. 22, 2001    (JP)    .............................. 2001-46106

(51) Int. Cl.
*H04L 9/32* (2006.01)
(52) U.S. Cl. ...................... 713/168; 455/3.04; 455/90.1; 455/410; 455/500; 348/E5.005; 348/E7.063; 725/54; 380/259; 367/117
(58) Field of Classification Search ................ 713/168; 380/258–259; 725/42, 50, 54; 348/E5.005, 348/E7.063; 375/240.26; 455/3.04, 90.1, 455/410, 500; 367/117
See application file for complete search history.

(56) References Cited

U.S. PATENT DOCUMENTS 5,999,623 A * 12/1999 Bowman et al. ............ 380/239

(Continued)

FOREIGN PATENT DOCUMENTS

JP        7 87082        3/1995

(Continued)

OTHER PUBLICATIONS

Papadimitriou C et al: "Multimedia information caching for personalized video-on-demand" Computer Communications, Elsevier Science Publishers BV, Amsterdam, NL, vol. 18, No. 3, Mar. 1995, pp. 204-216, XP004032501 ISSN: 0140-3664.

*Primary Examiner*—Thanhnga B Truong
(74) *Attorney, Agent, or Firm*—Frommer Lawrence & Haug LLP; William S. Frommer; Thomas F. Presson

(57) ABSTRACT

A transmitting apparatus adapted to effectively use the band for transferring programs of television broadcasting. A program of a first channel transmitted from the transmitting side can be viewed in real time on the receiving side. A program of a second channel is transmitted to the receiving side in advance in a time zone of lower audience rate than other time zones and stored in a storage device of the receiving side. Each program to be stored is encrypted. When a provision time of a program comes, the data such as a key are transmitted from the transmitting side to the receiving side along with the program data of the first channel. The receiving side extracts the data such as a key and, by use of the extracted data, provides the program stored in the storage device to viewers.

16 Claims, 19 Drawing Sheets

U.S. PATENT DOCUMENTS

| | | | |
|---|---|---|---|
| 6,012,086 A | 1/2000 | Lowell | |
| 6,243,469 B1 * | 6/2001 | Kataoka et al. | 380/255 |
| 6,351,538 B1 * | 2/2002 | Uz | 380/201 |
| 6,584,552 B1 * | 6/2003 | Kuno et al. | 711/163 |
| 6,977,964 B1 * | 12/2005 | Asamura et al. | 375/240.28 |
| 7,017,179 B1 * | 3/2006 | Asamoto et al. | 725/152 |
| 7,194,758 B1 * | 3/2007 | Waki et al. | 725/141 |
| 2002/0170053 A1 * | 11/2002 | Peterka et al. | 725/31 |

FOREIGN PATENT DOCUMENTS

| | | |
|---|---|---|
| JP | 10-336625 | 12/1998 |
| JP | 11 196399 | 7/1999 |
| WO | WO 99 66721 | 12/1999 |
| WO | WO 00 10327 | 2/2000 |
| WO | WO 00 27106 | 5/2000 |

* cited by examiner

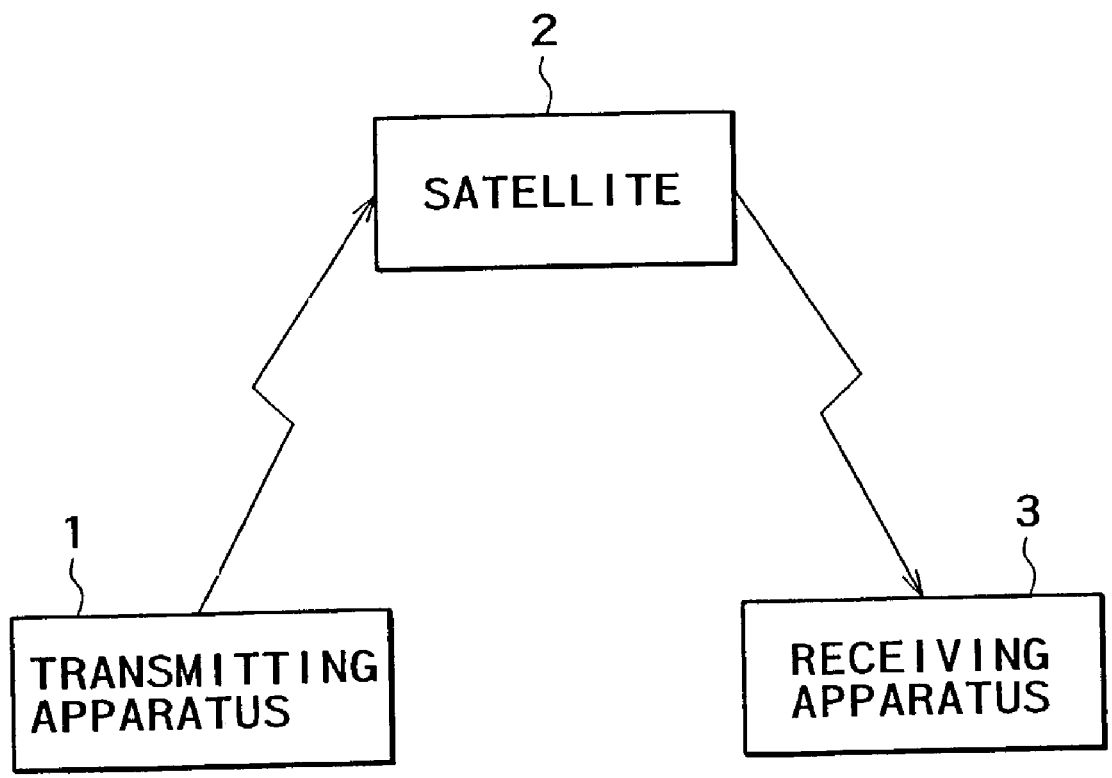

FIG.5
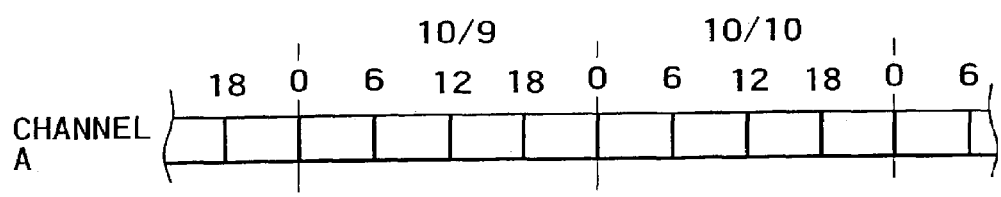
FIG.6
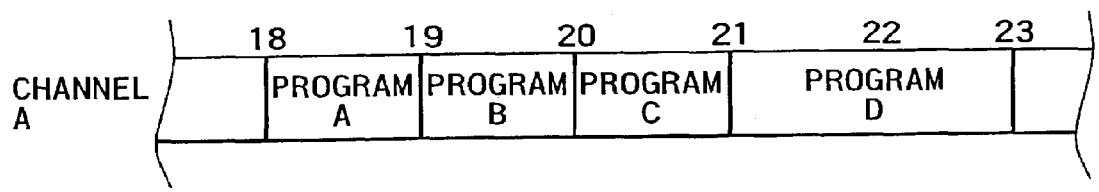
FIG.7
| CHANNEL | DATE | START TIME | LENGTH | PROGRAM NAME | ATTRIBUTE |
|---|---|---|---|---|---|
| A | 10/10 | 1800 | 0100 | PROGRAM A | ······ |
| A | 10/10 | 1900 | 0100 | PROGRAM B | ······ |
| A | 10/10 | 2000 | 0100 | PROGRAM C | ······ |
| A | 10/10 | 2100 | 0200 | PROGRAM D | ······ |

| DIRECT/PRELOAD | CHANNEL | DATE | START TIME | LENGTH | PROGRAM NAME | ATTRIBUTE |
|---|---|---|---|---|---|---|
| DIRECT | A | 10/10 | 1800 | 0100 | PROGRAM A | ······ |
| DIRECT | A | 10/10 | 1900 | 0100 | PROGRAM B | ······ |
| DIRECT | A | 10/10 | 2000 | 0100 | PROGRAM C | ······ |
| DIRECT | A | 10/10 | 2100 | 0200 | PROGRAM D | ······ |
| PRELOAD | B | 10/10 | 1900 | 0200 | PROGRAM X | ······ |
| PRELOAD | B | 10/10 | 2100 | 0200 | PROGRAM Y | ······ |

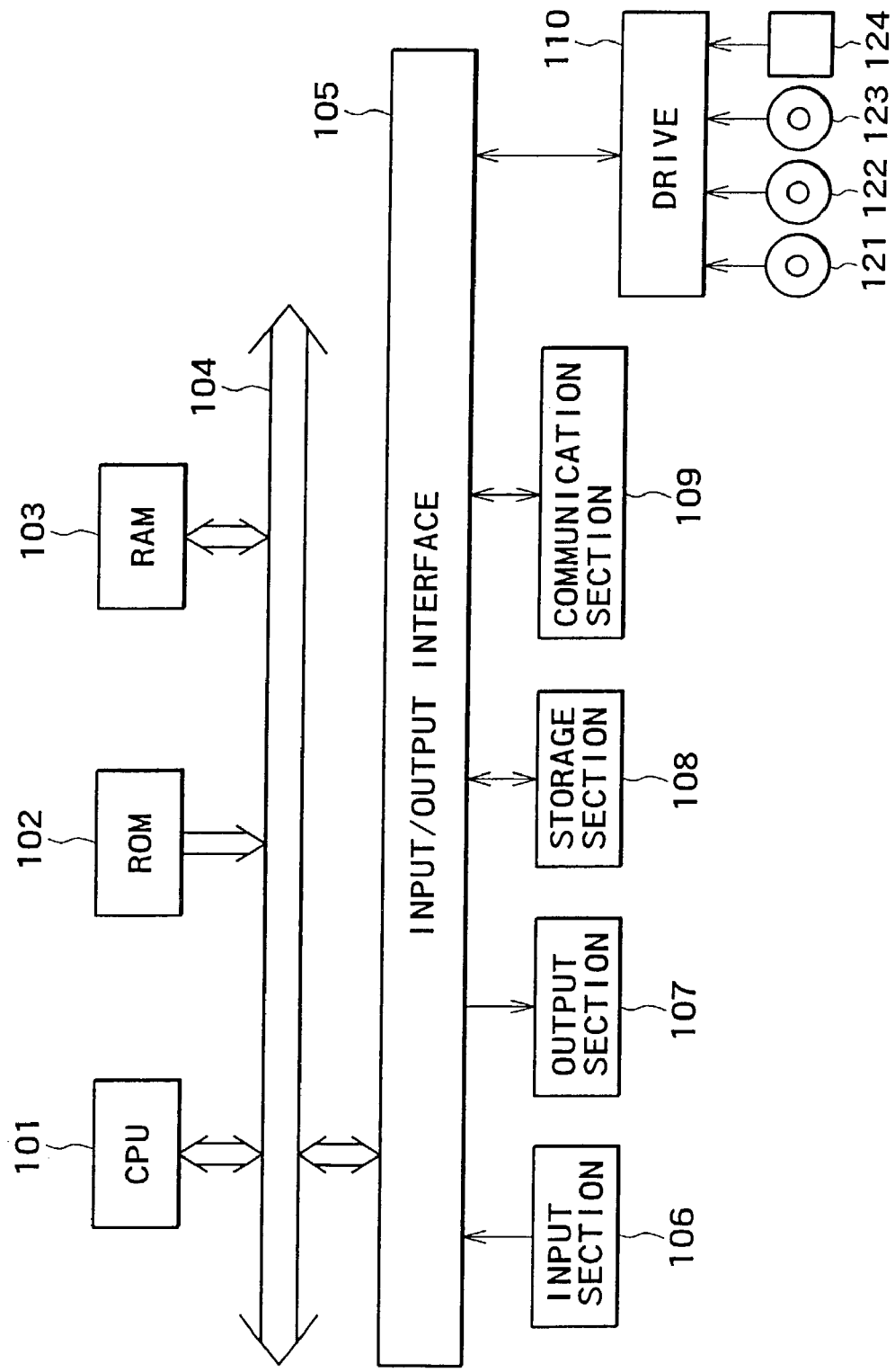

US 7,664,951 B2

TRANSMITTING APPARATUS FOR PROVIDING INFORMATION BY EFFECTIVE USE OF BANDS

TECHNICAL FIELD

The present invention relates generally to a transmitting apparatus and, more particularly, to a transmitting apparatus suitably for use in providing information such as programs to users by effective use of bands.

BACKGROUND ART

Recently, the television broadcasting by use of artificial satellites is becoming pervasive. As shown in FIG. 1, data associated with a program transmitted from a transmitting apparatus 1 of a broadcasting station are supplied via a satellite 2 to a receiving apparatus 3 installed in each home.

FIG. 2 shows an exemplary configuration of the transmitting apparatus 1. The transmitting apparatus 1 has a control section 11 which controls the inside of the apparatus. The control section 11 has a memory 12 for accumulating organization data. The organization data denotes the data associated with a schedule (a program table) for use in broadcasting programs. The control section 11 also has a clock 13, by which clocking the data transmission timing of each section is controlled.

A VTR (Video Tape Recorder) cart 14 is composed of a plurality of VTRs, a device for carrying and loading VTR tapes into these VTRs, and a shelf for accommodating these VTR tapes and, under the control of the control section 11, carries and sets predetermined VTR tapes from the shelf to the VTRs. Of the data reproduced from each VTR tape set to each VTR, video data are supplied to a video encoder 15 while audio data are supplied to an audio encoder 16.

The video encoder 15 and the audio encoder 16 encode the supplied data by a predetermined encoding algorithm, MPEG (Moving Picture Expert Group) for example, and output the resultant data to a multiplexer 17. An EPG (Electric Program Guide) generated by an EPG generating section 18 is also supplied to the multiplexer 17.

Under the control of a multiplexing control section 19, the multiplexer 17 multiplexes the supplied data. A standard by which the multiplexer 17 executes multiplexing is time-division multiplexing including MPEG2 TS (ISO13818-1) for example.

The multiplexing control section 19 receives information from the control section 11 to determine the PID (Packet ID) of each TS (Transport Stream) packet for transporting video and audio streams and outputs the determined PID to the multiplexer 17. On the basis of the PID supplied from the multiplexing control section 19, the multiplexer 17 sets the PID of each TS packet in which the supplied video and audio streams are stored.

The multiplexing control section 19 generates information associated with PSI (Program Specific Information) including PID information and supplies the generated information to the multiplexer 19. The multiplexer 17 includes the supplied PSI information in other signals to perform multiplexing.

The control section 11 controls each component of the transmitting apparatus 1 and, at the same time, converts the clock information provided by the incorporated clock 13 into a PCR (Program Clock Reference) to supply it to the multiplexer 17. Also, the control section 11 issues a command to the multiplexing control section 19 telling to which stream the PCR is to be added. In the description below, it is assumed that the PCR is attached to the video stream.

The multiplexing control section 19 specifies the same PID as the PID specified for the video stream as the PID of the transport packet to which PCR is added. The multiplexer 17 includes the supplied PCR into the transport packet of the video stream.

The output of the multiplexer 17 is supplied to an ECC (Error Correcting Code)/modulating section 20 to be added with an error correction code and modulated for transmission, the resultant data being outputted to an amplifying section 21. The amplifying section 21 amplifies the supplied data to a power level enough for transmission and transmits the amplified data as a radio wave via an antenna 22.

The data thus transmitted from the transmitting apparatus 1 are received by the receiving apparatus 3 via the satellite 2. FIG. 3 illustrates an exemplary configuration of the receiving apparatus 3. The receiving apparatus 3 has a control section 31 for controlling the inside of this apparatus. The control section 31 has a memory 32 for storing EPG and PSI information and a clock 33.

Radio waves (or radio signals) received at an antenna 34 of the receiving apparatus 3 are outputted to a front end 35. The signals are tuned in, demodulated, and error correction codes are removed from the signals to output the signals as a transport stream. The transport stream outputted from the front end 35 is outputted to a PSI filter 36, an EPG filter 37, an output PID filter 38, and a PCR PID filter 39. These filters each extract a transport packet including the specified PID from the supplied transport stream.

The PSI filter 36 extracts a transport packet which contains PSI from the supplied transport stream and outputs the obtained PSI to the control section 31. The control section 31 stores the received PSI into the memory 32.

The EPG PID filter 37 extracts a transport packet which contains an EPG from the supplied transport stream. The PID of the transport packet containing the EPG is supplied from the control section 31. On the basis of this supplied PID, the EPG PID filter 37 further extracts EPG information from the extracted transport packet and outputs the extracted EPG information to the control section 31. The control section 31 stores the received EPG information into the memory 32.

The output PID filter 38 extracts a transport packets which contains a video stream and an audio stream from the supplied transport stream. The PID of the transport packet containing the video stream and audio stream is supplied from the control section 31.

On the basis of the PID supplied from the control section 31, the output PID filter 38 extracts the video stream from the supplied transport packet and outputs the extracted video stream to a video decoder 40. Likewise, on the basis of the supplied PID, the output PID filter 38 extracts the audio stream from the supplied transport packet and outputs the extracted audio stream to an audio decoder 41.

The PCR PID filter 39 extracts a transport packet which contains a PCR from the supplied transport stream. The PID of the transport packet containing this PCR is supplied from the control section 31. On the basis of the supplied PID, the PCR PID filter 39 extracts the PCR from the supplied transport stream and supplies the extracted PCR to a STC (System Time Clock) 42. The STC 42 synchronizes its clock on the basis of the supplied PCR to generate a reference clock.

An OSD (On Screen Display) 43 generates a video signal, under the control of the control section 31 as required, and supplies the generated video signal to an adding section 44. The adding section 44 adds (or mixes) the video signal supplied from the OSD 43 to the video signal supplied from the video decoder 40 and outputs the resultant signal to a television receiver (not shown) connected to the receiving apparatus 3.

The receiving apparatus 3 receives a plurality of programs at the same time. The receiving apparatus 3 must provide a program requested by the user from among the plurality of received programs. The program selecting operation to be performed by the receiving apparatus 3 will be described below with reference to the flowchart shown in FIG. 4. The processing described in the flowchart shown in FIG. 4 is executed when the receiving apparatus 3 is powered on by a remote controller (not shown) for example.

In step S1, the control section 31 of the receiving apparatus 3 determines whether or not any one of the PSI information and the EPG information stored in the memory 32 is older than the current time as information and lacking as information. Namely, the control section 31 compares the PSI and EPG information stored in the memory 32 with the clock information indicated by the clock 33 to determine whether or not the information of PSI and EPG is older than the current time and lacking as information.

If any one of the PSI information and the EPG information stored in the memory 32 is found older than the current time or lacking as information in step S1, then the procedure goes to step S2; if the information is found not older than the current time or not lacking as information, then the procedure goes to step S3 by skipping step S2.

In step S2, the PSI and the EPG are updated. The control section 31 commands the front end 35 to receive a default channel. On the receiving apparatus 3, a predetermine channel is set as default beforehand. The front end 35 tunes in the frequency/band on which the default channel is transmitted, demodulates the signal, performs error correction on the signal by use of an error correction code, and outputs the resultant signal as a transport stream.

The transport stream outputted from the front end 35 is supplied to the PSI filter 36 and the EPG PID filter 37. The transport stream is also supplied to the output PID filter 38 and the PCR PID filter 39; in this case, however, the supplied transport stream is not used in these filters (or not processed by these filters).

The PSI filter 36 extracts the PSI information from the supplied transport stream and supplies the extracted PSI information to the control section 31. The PSI supplied to the control section 31 is stored in the memory 32. In this case, the information associated with the number of programs to be broadcast at the same time (1 in this example), the number of video/audio streams for each program (1 each in this example), and a method of transmitting the PID and EPG of transport packets carrying the PID and PCR for each stream is supplied to the control section 31.

Since the PID containing PSI is determined beforehand, the control section 31 need not supply the PID to the PSI filter 36. The control section 31 supplies the value of the PID of the transport packet containing EPG to the EPG PID filter 37. By use of the supplied PID value, the EPG PID filter 37 extracts EPG data therefrom from the transport packet and supplies the extracted EPG data to the control section 31. The EPG information supplied to the control section 31 are stored in the memory 32.

The PSI and EPG information is contained in each transport stream. In the control section 31, the above-mentioned operation is always performed, and always updating the PSI and EPG information.

As required or in response to a user command from a remote controller not shown, the control section 31 extracts and manipulates the EPG information and commands the OSD 43 to converts the resultant information into a video signal. The video signal generated by the OSD 43 is mixed by the adding section 44 with the output signal of the video decoder 40 and the resultant signal is outputted.

In step S3, the control section 31 reads the channel viewed immediately before the last power-off sequence from a non-volatile storage device not shown for example. It is assumed here that channel A was viewed immediately before the last power-off sequence.

The control section 31 commands the front end 35 to receive channel A. The front end 35 tunes in the transmitted frequency/band of channel A, demodulates the signal, performs error correction on the demodulated signal by error correction code, and outputs the transport stream.

The transport stream outputted from the front end 35 is supplied to the PSI filter 36, the EPG PID filter 37, the output PID filter 38, and the PCR PID filter 39.

As described above, the PSI filter 204 extracts PSI information from the supplied transport stream and supplies the extracted PSI information to the control section 31, upon which the PSI stored in the memory 32 is updated. As described above, the EPG PID filter 37 also extracts EPG information from the transport packet by use of the value of the supplied PID and supplies the extracted EPG information to the control section 31. The control section 31 updates the EPG information stored in the memory 32.

The control section 31 supplies to the output PID filter 38 the value of the PID of the transport packet carrying a video stream and the value of the PID of the transport packet carrying an audio stream. At the same time, the control section 31 supplies the value of the PID of the transport packet containing an EPG to the EPG PID filter 37. The control section 31 supplies the value of the PID of the transport packet containing a PCR to the PCR PID filter 39.

The output PID filter 38 extracts the video stream and the audio stream from the transport packet by use of the supplied two PID values. The video stream is supplied to the video decoder 40 while the audio stream is supplied to the audio decoder 41.

The video decoder 40 converts (or decodes) the supplied video stream encoded by a predetermined encoding scheme into a video signal and outputs it. Likewise, the audio decoder 41 converts the supplied audio stream into an audio signal and outputs it.

The PCR PID filter 39 extracts a PCR from the transport packet by use of the given PID value and supplies the extracted PCR to the STC 42. The STC 42 synchronizes the own clock with the supplied PCR. The internal clock generated by use of the PCR is used as a synchronous clock for the video decoder 40 and audio decoder 41.

In step S4, the control section 31 determines whether or not a channel change command has been issued by a user not shown through a remote controller not shown or a button for example arranged on the receiving apparatus 3. If the channel is found changed, the procedure goes to step S5. If the channel is found not changed, the procedure returns to step S4 to repeat the processing therefrom.

If the command is found issued by the user in step S4, this command is sent to the control section 31, which in turn commands the front end 35 to receive the specified channel. Consequently, in step 5, the transport stream outputted from the front end 35 is processed as described above, thereby outputting the program of the newly selected channel. When this processing comes to an end, the procedure returns to step S4 to repeat the processing therefrom.

Thus, the user-specified program is provided to the user from among the plurality of channels (programs) received by the receiving apparatus 3.

The following describes channels which are transmitted from the transmitting apparatus 1 to the receiving apparatus 3. In the following example, the case in which only one channel A is provided over 24 hours as shown in FIG. 5. It is assumed that the band prepared as broadcasting facilities be 24 Mbps for a whole day. This value is the bit rate before performing error correction and modulation and the bit rate of the data to be transferred from the multiplexer 17 to the ECC/modulating section 20.

FIG. 6 illustrates an enlarged portion around a prime time of October 10 shown in FIG. 5, with program divisions and program names added. The prime time denotes a time zone in which audience rate is higher than in other time zones; for example, a time zone from 19:00 to 23:00.

In channel A, "program A" is provided from 18:00 to 19:00 of October 10. Likewise, "program B" is provided from 19:00 to 20:00, "program C" is provided from 20:00 to 21:00, and "program D" is provided from 21:00 to 23:00.

A program provision (broadcasting) schedule listed with necessary information as shown in FIG. 7 is called organization data for example. Organization data are a collection of plural records for each program. Each record for each program is constituted by six fields "channel," "date," "start time," "length," "program name," and "attribute."

The organization as described above are set to the control section 11 by the administrator not shown of the transmitting apparatus 1 and stored in the memory 12. The organization data are used to control the transmitting apparatus 1 in its entirety.

However, the above-mentioned conventional configuration has a problem that, as described above, channel A provides programs by use of a transmission path having a band of 24 Mbps all day, which indicates that the program provision is performed on the same band regardless of prime time and other time zones, resulting in the ineffective usage of the band.

DISCLOSURE OF INVENTION

It is therefore an object of the present invention to provide a transmitting apparatus which is configured to transmit data associated with a program to a receiving apparatus and store these data therein in a time zone in which the band is not tight and provide this program in a prime time, thereby providing an effect as if there were an increase in channels in the prime time.

In carrying out the invention and according to one aspect thereof, there is provided a transmitting apparatus comprising: input means for inputting data of a program; encrypting means for encrypting the data inputted from the input means by use of a predetermined key; first transmitting means for transmitting, in a predetermined time zone, the data encrypted by the encrypting means; and second transmitting means for transmitting the key after the predetermined time zone and at a time for enabling the program to be viewed on the receiving side at a viewing time intended by the transmitting side.

In the above-mentioned transmitting apparatus, the predetermined time zone may be lower in audience rate than other time zones.

According to another aspect of the present invention, the above-mentioned transmitting apparatus, further comprises: detecting means for detecting an intra-picture from the data inputted from the input means; and creating means for creating associating information for associating a position of the intra-picture detected by the detecting means with an elapsed time from a starting time of the program; wherein the first transmitting means transmits the associating information along with the encrypted data.

In the above-mentioned transmitting apparatus, the first transmitting means, by use of a transmission channel for transmitting data of a first program to be viewed by a viewer in a first program channel, transmits, in the predetermined time zone, data of a second program to be viewed by the viewer in a second program channel; and the second transmitting means transmits the key by use of a same transmission channel as the transmission channel to be used by the first transmitting means.

The above-mentioned transmitting apparatus, further comprising: first generating means for generating a first EPG associated with both the first program and the second program; and second generating means for generating a second EPG associated with the second program; wherein the first EPG includes a flag indicative of the first program or the second program.

In carrying out the invention and according to another aspect thereof, there is provided a transmitting method comprising: an encrypting step for encrypting program data by use of a predetermined key; a first transmission control step for controlling the transmission of the data encrypted by the encrypting step in a predetermined time zone; and a second transmission control step for controlling the transmission of the key after the predetermined time zone and at a time for enabling the program to be viewed on the receiving side at a viewing time intended by the transmitting side.

In carrying out the invention and according to still another aspect thereof, there is provided a first recording medium recording a computer-readable program comprising: an encrypting step for encrypting program data by use of a predetermined key; a first transmission control step for controlling the transmission of the data encrypted by the encrypting step in a predetermined time zone; and a second transmission control step for controlling the transmission of the key after the predetermined time zone and at a time for enabling the program to be viewed on a receiving side at a viewing time intended by a transmitting side.

In carrying out the invention and according to still another aspect thereof, there is provided a first program for causing a computer to execute: an encrypting step for encrypting program data by use of a predetermined key; a first transmission control step for controlling the transmission of the data encrypted by the encrypting step in a predetermined time zone; and a second transmission control step for controlling the transmission of the key after the predetermined time zone and at a time for enabling the program to be viewed on a receiving side at a viewing time intended by a transmitting side.

In carrying out the invention and according to yet another aspect thereof, there is provided a receiving apparatus comprising: storage means for receiving and storing, as data of a second program of a second program channel, encrypted program data supplied in a predetermined time zone by use of a transmission channel for transmitting data of a first program of a first program channel; a receiving means for receiving a key for decrypting the program data, the key being transmitted after the predetermined time zone and at a time for enabling the viewing, on the receiving side, of the second program at a viewing time intended by the transmitting side; and a reproducing means for reproducing the second program by decrypting the data of the second program stored in the storage means by use of the key received by the receiving means.

In carrying out the invention and according to a different aspect thereof, there is provided a receiving method comprising: a storage control step for controlling the reception of encrypted program data supplied in a predetermined time zone by use of a transmission channel for transmitting data of a first program of a first program channel and controlling the storage of the supplied data as data of a second program of a second program channel; a reception control step for controlling the reception of a key for decrypting the program data, the key being transmitted after the predetermined time zone and at a time for enabling the viewing, on the receiving side, of the second program at a viewing time intended by the transmitting side; and a reproducing step for reproducing the second program by decrypting the data of the second program in which the storage is controlled in the storage control step by use of the key received by the reception control step.

In carrying out the invention and according to a still different aspect thereof, there is provided a second recording medium recording a computer-readable program comprising: a storage control step for controlling the reception of encrypted program data supplied in a predetermined time zone by use of a transmission channel for transmitting data of a first program of a first program channel and controlling the storage of the supplied data as data of a second program of a second program channel; a reception control step for controlling the reception of a key for decrypting the program data, the key being transmitted after the predetermined time zone and at a time for enabling the viewing, on the receiving side, of the second program at a viewing time intended by the transmitting side; and a reproducing step for reproducing the second program by decrypting the data of the second program in which the storage is controlled in the storage control step by use of the key received by the reception control step.

In carrying out the invention and according to a yet different aspect thereof, there is provided a second program for causing a computer to execute: a storage control step for controlling the reception and storage of encrypted program data supplied in a predetermined time zone by use of a transmission channel for transmitting data of a first program of a first program channel and controlling the storage of the supplied data as data of a second program of a second program channel; a reception control step for controlling the reception of a key for decrypting the program data, the key being transmitted after the predetermined time zone and at a time for enabling the viewing, on a receiving side, of the second program at a viewing time intended by a transmitting side; and a reproducing step for reproducing the second program by decrypting the data of the second program in which the storage is controlled in the storage control step by use of the key received by the reception control step.

In carrying out the invention and according to a separate aspect thereof, there is provided an information transmitting/receiving system having a transmitting apparatus for transmitting data and a receiving apparatus for receiving the data transmitted from the transmitting apparatus, the transmitting apparatus comprising: encrypting means for encrypting data of a program by use of a predetermined key; first transmitting means for transmitting, in a predetermined time zone, the data encrypted by the encrypting means to the receiving apparatus; and second transmitting means for transmitting, to the receiving apparatus, the predetermined key after the predetermined time zone and at a time for enabling the program to be viewed on the receiving side at a viewing time intended by the transmitting apparatus; the receiving apparatus comprising: storage means for receiving and storing the data of the program transmitted from the first transmitting means; receiving means for receiving the key transmitted from the second transmitting means; and reproducing means for reproducing the program at a viewing time on the receiving apparatus intended by the transmitting apparatus by decoding the data of the program stored in the storage means by use of the key received by the receiving means.

In carrying out the invention and according to a still separate aspect thereof, there is provided an information transmitting/receiving method for an information transmitting/receiving system having a transmitting apparatus for transmitting data and a receiving apparatus for receiving the data transmitted from the transmitting apparatus, the information transmitting/recording method for the transmitting apparatus comprising: an encrypting step for encrypting data of a program by use of a predetermined key; a first transmission control step for controlling the transmission of the associating information created in the creating step and the data encrypted in the encrypting step to the receiving apparatus in a predetermined time zone; and a second transmission control step for controlling the transmission of the predetermined key to the receiving apparatus after the predetermined time zone and at a time for enabling the program to be viewed on the receiving side at a viewing time intended by the transmitting apparatus; the information transmitting/receiving method for the receiving apparatus comprising: a storage control step for controlling the reception and storage of the data of the program in which the transmission is controlled in the first transmission control step; a reception control step for controlling the reception of the key in which the transmission is controlled in the second transmission control step; and a reproducing step for reproducing the program at a viewing time on the receiving apparatus intended by the transmitting apparatus by decoding the data of the program in which the storage is controlled in the storage control step by use of the key in which the reception is controlled in the reception control step.

In carrying out the invention according to a yet separate aspect thereof there is provided a third recording medium recording a computer-readable program for an information transmitting/receiving system having a transmitting apparatus for transmitting data and a receiving apparatus for receiving the data transmitted from the transmitting apparatus, the program for the transmitting apparatus comprising: an encrypting step for encrypting data of a program by use of a predetermined key; a first transmission control step for controlling the transmission of the associating information created in the creating step and the data encrypted in the encrypting step to the receiving apparatus in a predetermined time zone; and a second transmission control step for controlling the transmission of the predetermined key to the receiving apparatus after the predetermined time zone and at a time for enabling the program to be viewed on the receiving side at a viewing time intended by the transmitting apparatus; the program for the receiving apparatus comprising: a storage control step for controlling the reception and storage of the data of the program in which the transmission is controlled in the first transmission control step; a reception control step for controlling the reception of the key in which the transmission is controlled in the second transmission control step; and a reproducing step for reproducing the program at a viewing time on the receiving apparatus intended by the transmitting apparatus by decoding the data of the program in which the storage is controlled in the storage control step by use of the key in which the reception is controlled in the reception control step.

In carrying out the invention and according to another aspect thereof, there is provided a third program for a computer for controlling an information transmitting/receiving system having a transmitting apparatus for transmitting data and a receiving apparatus for receiving the data transmitted from the transmitting apparatus, the program causing the computer for controlling the transmitting apparatus to execute: an encrypting step for encrypting data of a program by use of a predetermined key; a first transmission control step for controlling the transmission of the associating information created in the creating step and the data encrypted by the encrypting step to the receiving apparatus in a predetermined time zone; and a second transmission control step for controlling the transmission of the predetermined key to the receiving apparatus after the predetermined time zone and at a time for enabling the program to be viewed on the receiving side at a viewing time intended by the transmitting apparatus; the program causing the computer for controlling the receiving apparatus to execute: a storage control step for controlling the reception and storage of the data of the program in which the transmission is controlled in the first transmission control step; a reception control step for controlling the reception of the key in which the transmission is controlled in the second transmission control step; and a reproducing step for reproducing the program at a viewing time on the receiving apparatus intended by the transmitting apparatus by decoding the data of the program in which the storage is controlled in the storage control step by use of the key in which the reception is controlled in the reception control step.

As described and according to the invention, in the transmitting apparatus and method and the first program, inputted data are encrypted by use of a predetermined key, the encrypted data are transmitted in a predetermined time zone, and the key is transmitted after the predetermined time zone to enable the viewing of a program on the receiving side at a time intended by the transmitting side.

As described and according to the invention, in the receiving apparatus and method and the second program, by use of a transmission channel for transmitting the data of a first program of a first channel, the encrypted program data transmitted in a predetermined time zone are received to be stored as the data of a second program of a second channel, a key for decrypting the program data transmitted after the predetermined time zone and at the time of viewing the second program on the receiving side intended by the transmitting side is received, the data of the second program stored are decrypted by the received key, and the stored data of the second program are decoded for reproduction.

As described and according to the invention, in the information transmitting/receiving system and method and the third program, the transmitting apparatus encrypts program data by use of a predetermined key, transmits the encrypted data to the receiving apparatus in a predetermined time zone, and transmits the key to the receiving apparatus after the predetermined time zone and at the time of viewing the program on the receiving side intended by the transmitting apparatus; and receiving apparatus receives the transmitted program data to store them, decodes the stored program data by use of the received key to reproduce the program at a viewing time on the receiving apparatus side intended by the transmitting apparatus.

BRIEF DESCRIPTION OF DRAWINGS

FIG. 5 illustrates a channel.

FIG. 6 illustrates programs.

FIG. 7 illustrates organization data.

FIG. 11 illustrates channels.

FIG. 12 illustrates organization data.

FIG. 23 illustrates recording media.

BEST MODE FOR CARRYING OUT THE INVENTION

Figure 2:
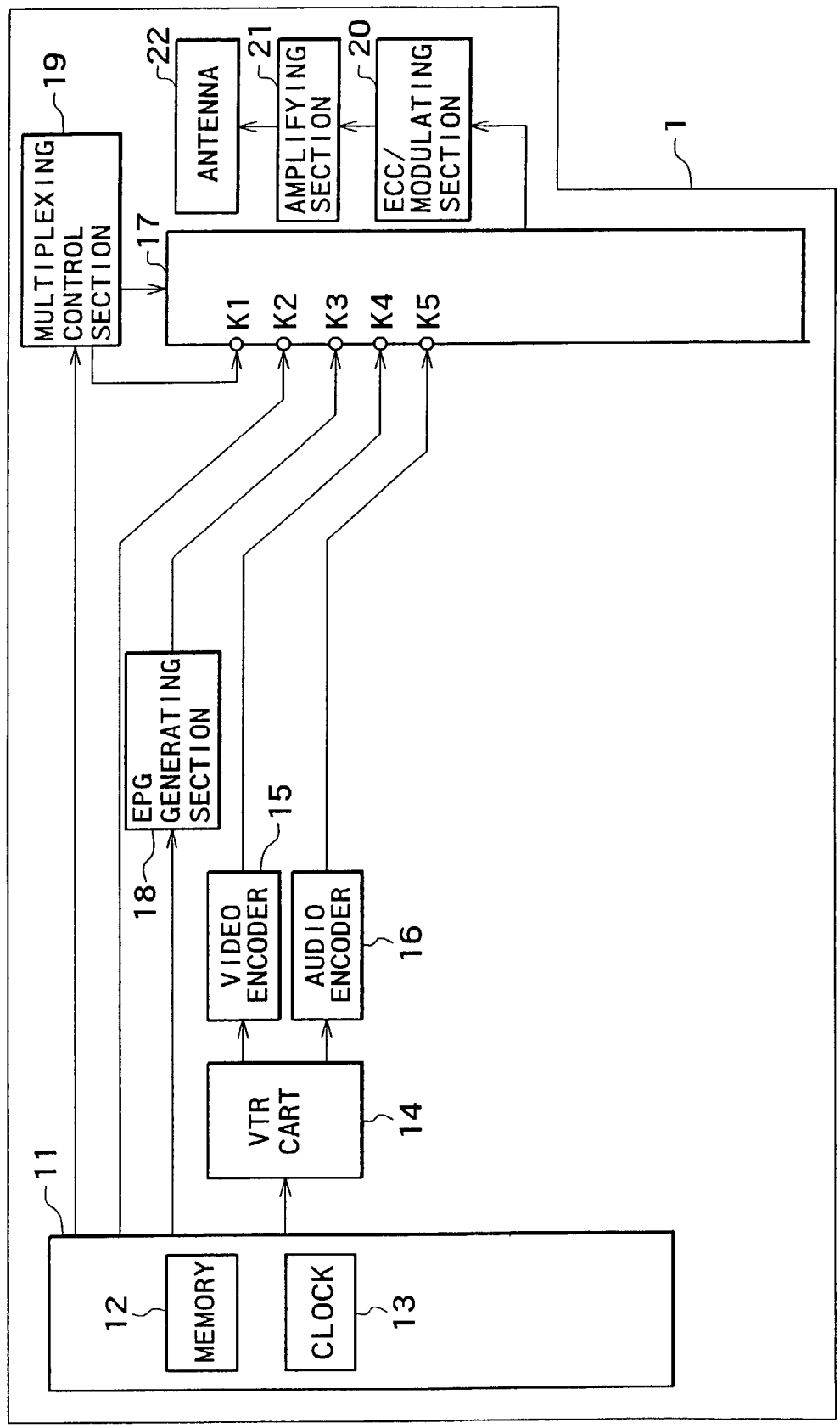
FIG. 2 illustrates an exemplary internal configuration of a prior-art transmitting apparatus 1.
Figure 8:
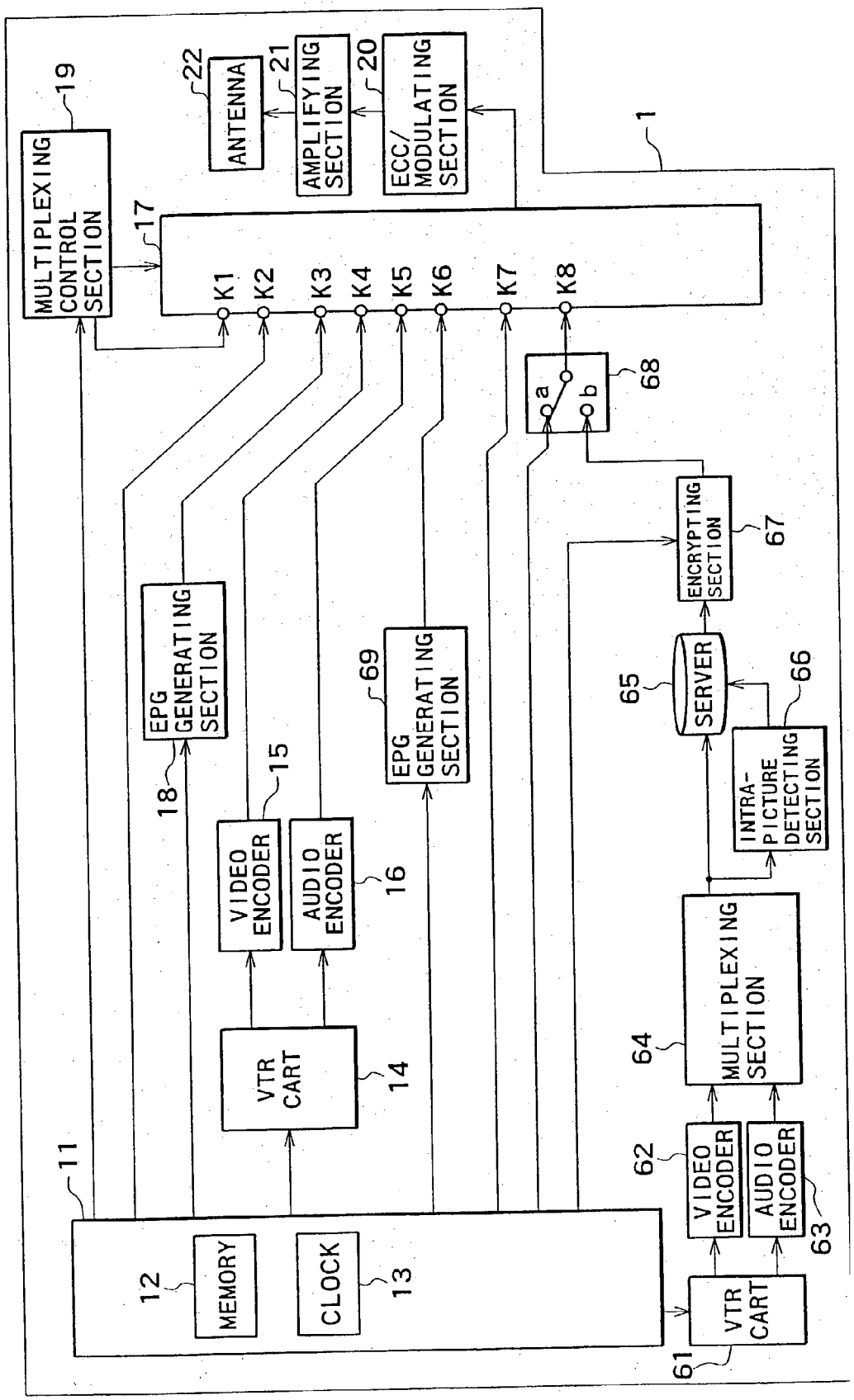
FIG. 8 illustrates an exemplary internal configuration of a transmitting apparatus 1 practiced as one embodiment of the present invention.
Figure 1:
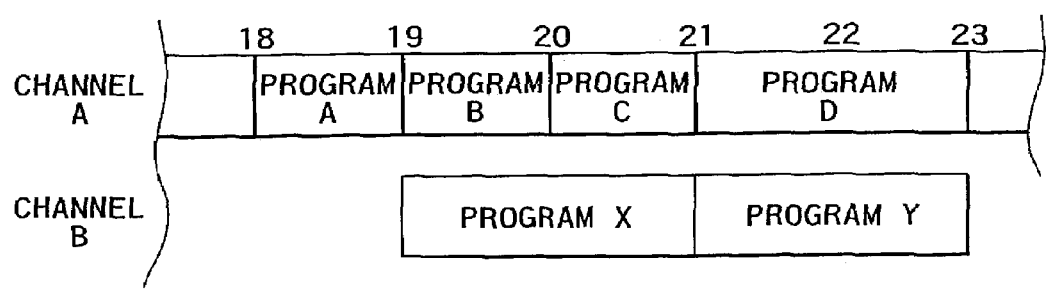
FIG. 1 illustrates an exemplary configuration of a system for transferring data.

The following describes embodiments of the present invention with reference to drawings. The following describes an example in which the present invention is applied to the system composed of the transmitting apparatus 1, the satellite 2, and the receiving apparatus 3 shown in FIG. 1. FIG. 8 illustrates a configuration of a transmitting apparatus 1 to which the present invention is applied. With reference to FIG. 8, components similar to those of conventional transmission apparatus 1 previously described with reference to FIG. 2 are denoted by the same reference numerals and the description of these components will be skipped.

The transmitting apparatus 1 has a VTR cart 61 which is the same in configuration as the VTR cart 14. A video output terminal and an audio output terminal of the VTR cart 61 are connected to a video encoder 62 and an audio encoder 63 respectively. The outputs of the video encoder 62 and the audio encoder 63 are supplied to a multiplexing section 64. The output of the multiplexing section 64 is supplied to a server 65.

The multiplexing section 64 performs time-division multiplex on the supplied signal. For the scheme of time-division multiplexing by the multiplexing section 64, MPEG2 TS (ISO13818-1) for example is available. Since the multiplexing performed by the multiplexing section 64 has only two inputs, PID is fixed, and there is no information such as PSI, the controlling section (the control section corresponding to the multiplexing control section 19 for controlling the multiplexer 17) need not be arranged to control the multiplexing section 64.

The output of the multiplexing section 64 is also supplied to an intra-picture detecting section 66. The intra-picture detecting section 66 detects the positions of intra-pictures according to the supplied bit stream. For all detected intra-pictures, data of combinations of time offset and byte offset from the beginning of the bit stream are generated to be supplied to the server 65. These data are referred to as a "positional information file." The server 65 stores the positional information file.

The output of the server 65 is supplied to the multiplexer 17 via a encrypting section 67 and a switch 68. The control section 11 supplies to the encrypting section 67 a key for encryption. The control section 11 also supplies a decryption key and other information to the multiplexer 17 via the switch 68. The positional information file stored in the server 65 or the key and other information supplied from the control section 11 are multiplexed with the transport stream to be supplied to the receiving apparatus 3. The multiplexer 17 is also supplied with data called control commands from the control section 11.

The control section 11 also supplies control commands for controlling the supply and provision of programs to be provided in advance. The data to be supplied to the multiplexer 17 via the switch 68 are referred to as a data stream. It should be noted that the bit rate of the data to be transferred from the multiplexer 17 to the ECC/modulating section 20 is 24 Mbps.

The following describes an operation of the transmitting apparatus 1 shown in FIG. 8. In the transmitting apparatus 1 shown in FIG. 8, two types of broadcasting (or provision forms) are available; one is the normal broadcasting in which transmitted programs can be viewed in real time on the receiver side; and the other is a broadcasting in which transmitted programs cannot be viewed in real time but programs viewable in prime time are transmitted to the receiving apparatus 3 in advance in non-prime time zones.

The following describes these two types of broadcasting. It should be noted that the transmission in which programs transmitted in real time can be viewed is referred to as broadcasting, while the transmission in which programs transmitted in real time cannot be viewed is referred to as provision.

Figure 9:
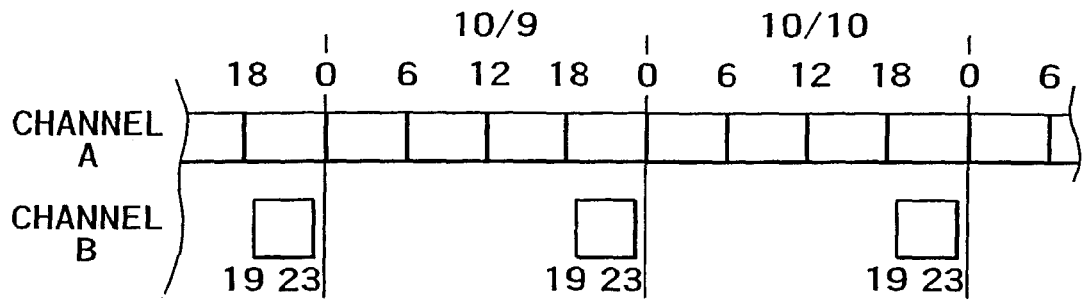
FIG. 9 illustrates channels.

FIG. 9 illustrates a channel configuration of the transmitting apparatus 1. In this example, two channels are used in a prime time (four hours from 19:00 to 23:00 in this example) and one channel is used in other time zones. It should be noted that, in the description below, a channel having a plurality of program channels is referred to as a transmission channel and a channel denotes a program channel which can be viewed by user.

A program of channel A, which is a program channel, is viewable on the receiving side for 24 hours. A program of channel B can be viewed on the receiving side only in the prime time.

The channel configuration illustrated here is only one example. For example, a configuration of three channels by three channels (three channels for 24 hours+three channels in prime time, totaling six channels).

Figure 10A:
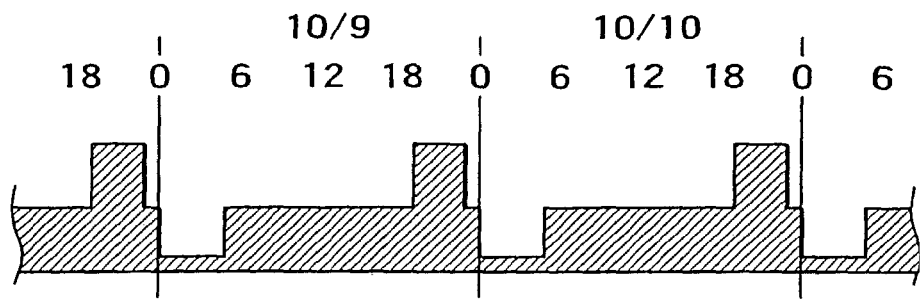
FIG. 10A illustrates a band.
Figure 10B:
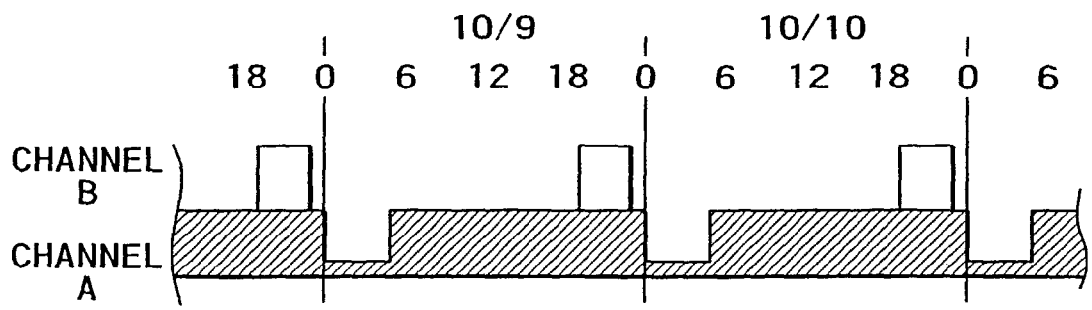
FIG. 10B illustrates a band.
Figure 10C:
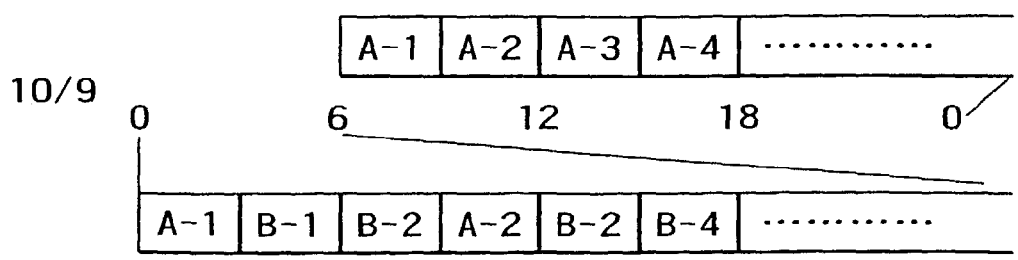
FIG. 10C illustrates a band.

FIGS. 10A through 10C are used to describe bands. FIG. 10A shows a total of bandwidths of programs to be provided herein. Namely, a total of 8 Mbps from 0:00 am to 6:00 am, 24 Mbps from 6:00 am to 7:00 pm, 48 Mbps from 7:00 pm to 11:00 pm, and 24 Mbps from 11:00 pm to 0:00 am. It should be noted that the band prepared as broadcasting facilities is 24 Mbps all day as described before. This value denotes the bit rate before error correction and modulation.

Hence, of the two channels to be provided in the prime time, the band (data) for one channel is provided to the receiving apparatus 3 in advance and stored in the receiving apparatus 3. Referring to FIG. 10B, the bandwidth which can be transmitted in the prime time is 48 Mbps, but the band which can be transmitted in real time is 24 Mbps. Therefore, the data of 4 hours×(48−24) Mbps are transmitted to the receiving apparatus 3 in advance and stored in the receiving apparatus 3.

For this reason, 16 Mbps (=24×4/6) of 24 Mbps are used for the transmission of the storage data in six hours from 0:00 to 6:00 in the morning. As a result, a bandwidth of 8 Mbps remains unused for the channel in the time zone from 0:00 to 6:00. It should be noted that this setting is illustrative purpose only; practically, more complicated band trade may be performed. Generally, a total of the bandwidths in which data can be preloaded must be greater than the amount of program data to be transmitted.

If the expiration of use of the data stored in the receiving apparatus 3 no more than one day, the following inequality is established in a time zone from 0:00 to 0:00 next day:

"A total of bandwidths in which program data to be preloaded">"amount of program data to be provided"

For the purpose of convenience, the transmission of a program for viewing in prime time to the receiving apparatus 3 in advance is referred to as "preloading" and the transmission of the program in real time is referred to as "direct transmission." "Channel" and "program" to be preloaded are referred to as "preloaded channel" and "preloaded program" and "channel" and "program" to be transmitted in real time are referred to as "direct transmitted channel" and "direct transmitted program."

In this example, of the two channels to be viewed in the prime time, the data of channel A are transmitted in direction transmission as a whole, while the data of channel B are transmitted in preloading as a whole. To be more specific, the programs of channel A are "direct-transmitted" over 24 hours, while the programs of channel B, which exist for four hours a day, are all "preloaded."

Referring to FIG. 10B, each of the programs of channel A is direct-transmitted at a bit rate of 8 Mbps in time zone from 0:00 to 6:00 and a bit rate of 24 Mbps in time zone from 6:00 to 24:00 (0:00). Each of the programs of channel B is preloaded at a bit rate of 16 Mbps in time zone from 0:00 to 6:00 to the receiving apparatus 3 and stored therein to be provided (made viewable) in time zone from 19:00 to 23:00.

Referring to FIG. 10C, in time zone from 0:00 to 6:00 in October 9 for example, data A-1, A-2, . . . which are program data of channel A, which is a program channel, and data B-1, B-2, . . . which are program data of channel B, which is a program channel, are transmitted to the receiving apparatus 3 in one transmission channel.

In time zone from 6:00 to 0:00 (24:00), only data A-1, A-2 . . . which are program data of channel A, which is a program channel, are transmitted to the receiving apparatus 3 in one transmission channel.

FIG. 11 illustrates a portion around the prime time of October 10 shown in FIG. 9, which is enlarged, with program divisions and program names added. As shown in FIG. 11, channel A provides "program A" in time zone from 18:00 to 19:00 in October 10. Likewise, "program B" is provided in time zone from 19:00 to 20:00, "program C" is provided in time zone from 20:00 to 21:00, and "program D" is provided in time zone from 21:00 to 23:00. Channel B provides "program X" in time zone from 19:00 to 21:00 and "program Y" in time zone from 21:00 to 23:00.

The organization data corresponding to the program provision (broadcasting) schedule shown in FIG. 11 is shown in FIG. 12. The organization data are configured by records of a plurality of programs. In configuration, the organization data are obtained by attaching a flag indicative of whether or not each program is for direct transmission or preloading to the configuration having only channel A as shown in FIG. 7. In the organization data shown in FIG. 12, the programs of channel A are all direct-transmitted, while the programs of channel B are all preloaded.

The programs of channel B which must be preloaded must be created in advance. The programs of channel A are transmitted in real time over 24 hours including the prime time. Therefore, the programs of channel A may be live (namely, need not be created beforehand).

Figure 13:
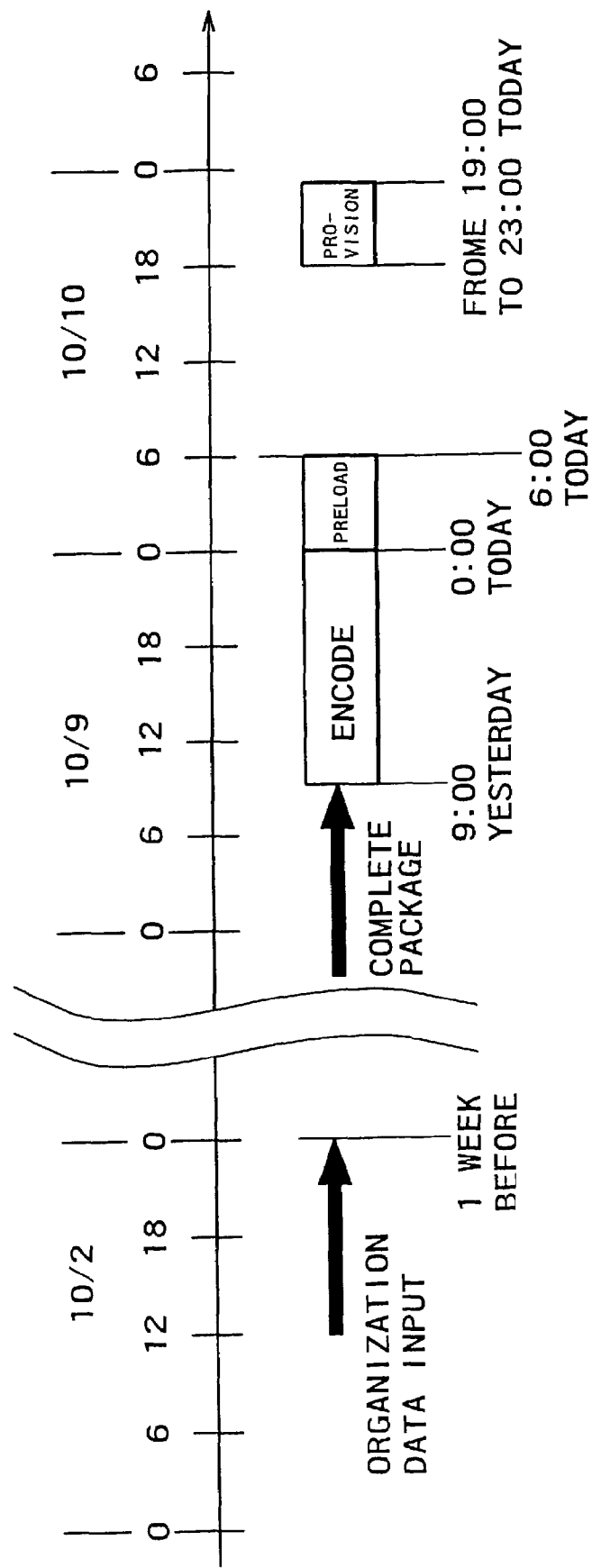
FIG. 13 illustrates a preloading schedule.

FIG. 13 illustrates the schedule on the transmitting apparatus 1 side associated with channel B which must be preloaded. The schedule shown in FIG. 13 is about the programs to be provided from 19:00 to 23:00 in October 10. This schedule holds the same with other days in relative program relationships with date offsets caused, so that the schedules of other days will be skipped.

It should be noted that a more flexible operation is performed in an emergency for example, thereby providing programs by changing the schedule in advance.

First, the organization data associated with a program concerned (a preloaded program concerned) is inputted in the transmitting apparatus 1 by at least one week before the provision. In this example, the organization data of October 10 are inputted by October 2. Likewise, the organization data associated with direct-transmitted programs are inputted by one week before the date of broadcasting. It should be noted that one week is a period for a smooth post-processing operation, so that this period need not be one week as far as the smooth post-processing operation is ensured.

When the organization data are inputted, one file name is determined for one program to be preloaded. This file name is used to identify the data (the file) of each program in the transmitting apparatus 1 and the receiving apparatus 3. The organization data are transmitted from the transmitting apparatus 1 to the receiving apparatus 3 as EPG data at certain intervals starting one week before the date of provision until the time of provision.

In the present embodiment, two routes of EPG information are arranged. On one route, only the EPG information for direct-transmitted programs is transmitted. On the other route, the EPG information for both direct-transmitted and preloaded programs are transmitted. Namely, the EPG information associated with direct-transmitted programs is transmitted by both schemes of the routes, while the EPG information associated with preloaded programs is transmitted only by the latter scheme of the route. For the preloaded programs, their file names are transmitted together.

In this arrangement of two routes for EPG information transmission as described above, one route is arranged for the receiving apparatus 3 which cannot accept preloading, namely the receiving apparatus 3 having no storage device for storing preloaded program data, of which detail will be described later, while the other route is arranged for the receiving apparatus 3 which can accept preloading.

The receiving apparatus 3 displays the received EPG data to the user, who can perform the processing such as program presetting for example on the basis of these data.

When the inputting of organization data into the transmitting apparatus 1 has been completed, the VTR tape recording the program to be preloaded is closed for deadline. The VTR tape recording the content of preloaded program is prepared until about 9:00 the day before the day of program provision. In this example, two VTR tapes corresponding to two programs "program X" and "program Y" shown in FIG. 11 are prepared and stored in the VTR cart 61 in the transmitting apparatus 1 by 9:00 of October 9.

Starting at 9:00 the day before the day of program provision, each program to be preloaded is encoded to create a "stream file." Preferably, the encoding has been completed during the day before the day of program provision. Therefore, in consideration of the time required for the encoding, the program data to be preloaded have preferably been created by 9:00 the day before preloading. Obviously, if a time for the encoding can be sufficiently allocated, the creation of the program data may have been completed after 9:00 the day before preloading.

At this moment, a "positional information file" listing intra-picture positions is created. This is because the encoding based on variable rates in video encoding requires the information for making conversion from temporal information into positional information. In the present embodiment, if MPEG2 is used for video data encoding, the data listing the temporal information and positional information for each intra-picture are created.

Before encoding program data, the bit rate of each program is determined. The bit rate may be determined before starting the encoding or while encoding. It is also practicable to set an average bit rate to two or more different programs or different bit rates may be used within a single program. Any scheme may be used for bit rate determination.

The transmission of a program to be preloaded, namely a stream file, to the receiving apparatus 3 starts from 0:00 of the day of program provision. As described with reference to FIGS. 10A through 10C, this event starts at 0:00 and ends at 6:00. First, the transmitting apparatus 1 issues to the receiving apparatus 3, an all-delete command for deleting all of the program data stored in the receiving apparatus 3.

The receiving apparatus 3 internally has a storage device for storing the program data preloaded, of which details will be described later. Upon reception of an all-delete command, the receiving apparatus 3 deletes the data from that storage device to make it ready for storing new data. In this case, the data to be deleted are those associated with the program (the program viewable in the prime time) provided in the prime time of October 9. Thus, the program data to be stored in the receiving apparatus 3 in the present embodiment are stored only for one day (in this case, the data for four hours of channel B), which are updated during night.

After issuing an all-delete command, the transmitting apparatus 1 transmits a stream file obtained by encoding a program. Next, the transmitting apparatus 1 transmits a positional information file corresponding to the transmitted stream file. The transmission of these two types of files is repeated by the number of programs. At this moment, the stream file is encrypted before transmission. The receiving apparatus 3 receives the encrypted stream file and records it as it is. The positional information file is transmitted without being encrypted.

Thus, the preloaded program data transmitted are received by the receiving apparatus 3 at a time prior to the prime time. Provision of the stored program data starts from 19:00 set as the prime time of the day of provision and becomes viewable. Namely, the transmitting apparatus 1 transmits time information, program information, and a key to the receiving apparatus 3. The key is used to decrypts the encrypted file.

When the user selects a preloaded program at the receiving apparatus 3, the receiving apparatus 3 identifies the file by the file name supplied with the EPG, decrypts the file by the supplied key, and provides the selected program to the user in synchronization with the supplied time information.

The following describes the preloading in more detail. In order to transmit a preloaded program, the present embodiment uses two streams in transport stream. One is a control stream for controlling preloading. The other is a data stream for use in downloading a stream file and a positional information file at program preloading. The data stream is also used to transmit time information and the key at program provision.

Figure 14:
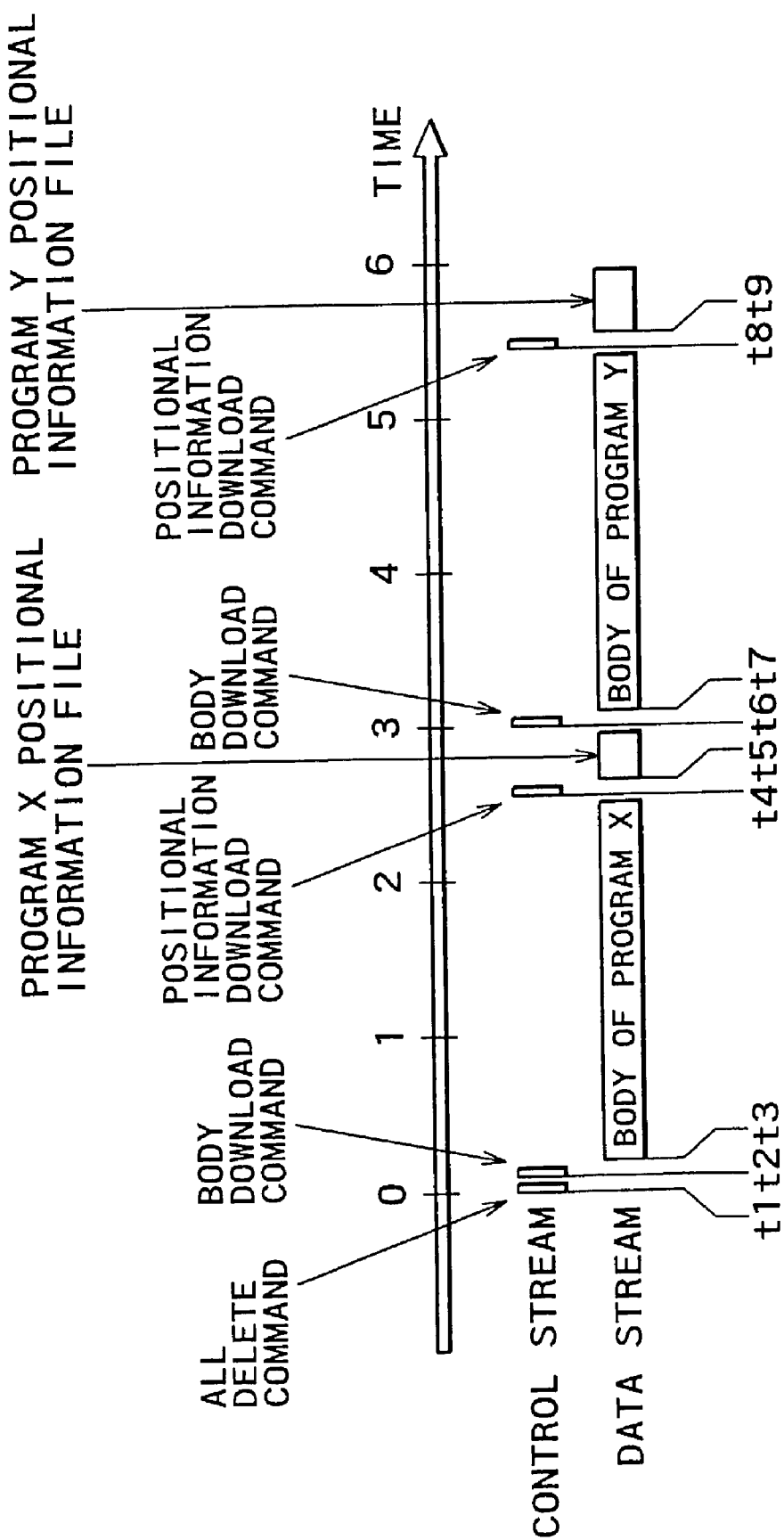
FIG. 14 illustrates the transmission of commands.

The procedure of the preloading will be described in further detail with reference to FIG. 14. At time t1, the transmitting apparatus 1 transmits an "all-delete command" in the control stream. Receiving this command, the receiving apparatus 3 deletes all files which have been preloaded and stored therein. This deletion allocates a free space necessary for accommodating files to be preloaded in the receiving apparatus 3.

Therefore, as with the present embodiment, if data to be preloaded are the program data for four hours in one channel, then the receiving apparatus 3 may arrange a storage device having a storage capacity enough for that amount of data.

Next, at time t2, the transmitting apparatus 1 transmits a "body download" command in the control stream. This command indicates the transmission of a stream file in the data stream after a predetermined time. This command contains the name (file name) and size of the stream file to be transmitted. Receiving the body download advance notice command, the receiving apparatus 3 makes preparations for downloading the stream file.

At time t3, the transmitting apparatus 3 starts transmitting the stream file in the data stream. The stream file is encrypted before transmission. The receiving apparatus 3 stores the received file into its storage device. At this moment, the stored file is managed by the file name specified by the body download advance notice command.

At time t4, the transmitting apparatus 1 transmits a "positional information download advance notice" command in the control stream. This command indicates the transmission of a positional information file after a predetermined time in the data stream. This command contains the name (file name) and size of the positional information file to be transmitted. Receiving the "positional information download advance notice" command, the receiving apparatus 3 makes preparations for the downloading of the positional information file.

At time t5, the transmitting apparatus 1 starts transmitting the "positional information file" in the data stream. The positional information file is transmitted without being encrypted. The receiving apparatus 3 stores the received data into its storage device. At this moment, the stored positional information file is managed by the file name specified by this "positional information download advance notice" command.

By the above-mentioned sequence of operations, one of the two program files which must be transmitted in advance, that is the two files for one program have been transmitted to the receiving apparatus 3, so that the files for the second program are transmitted. To be more specific, a sequence of operations are executed; at time t6, a "body download advance notice" command is transmitted, at time t7, the transmission of a "stream file" starts, at time t8, a "positional information download advance notice" command is transmitted, and, at time t9, the transmission of a "positional information file" starts.

It should be noted that, in the present embodiment, each command is transmitted only once; however each command may be transmitted over several times to build a system which is robust against transmission-system errors. Also it should be noted that the time shown in FIG. 14 (in the upper portion of the figure) and the times t1 through t9 (shown in the lower portion of the figure) are not corresponding to each other; for example, at time t6, a "body download" command is transmitted at 3:00. However, this command may be transmitted at other than 3:00 as long as the command can be transmitted in the flow of the processing.

The information stored in the receiving apparatus 3 immediately before the provision of a preloaded program is as follows. EPG information is transmitted one week before. EPG data have channel, program name, program start time, duration of time, information distinguishing between preloading and direct transmission, and so on. For each preloaded program, a file name is also added. Further, for each preloaded program, a "stream file" and a "positional information file" have been loaded beforehand.

Figure 15:
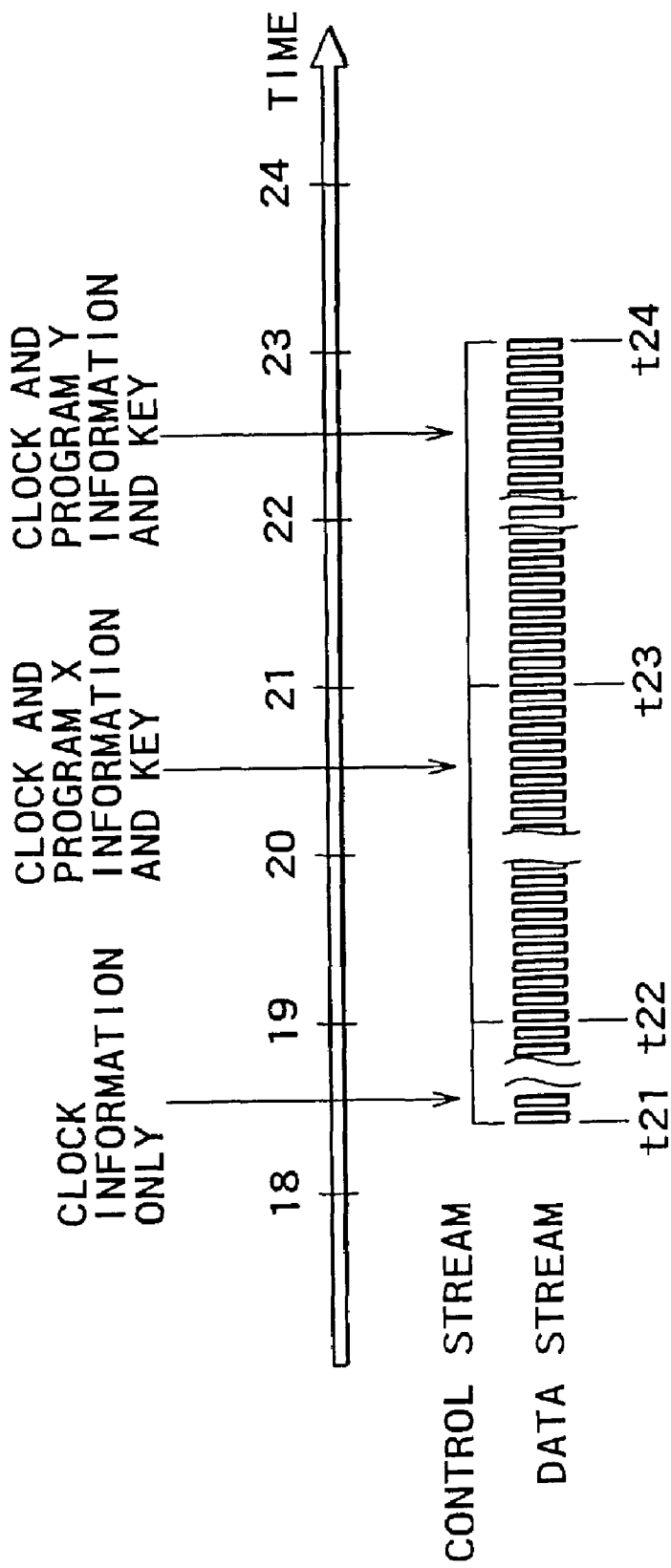
FIG. 15 illustrates the provision of preloaded programs.

The following describes the provision of preloaded programs (the processing for making these programs viewable to users) with reference to FIG. 15. At the provision time of preloading, no control stream is used; only a data stream is used.

First, at time t21 slight before a preloaded program provision time (in this example, 19:00), the transmitting apparatus 1 starts transmitting time information to the receiving apparatus 3. This is because the time information held in the receiving apparatus 3 must be matched with the time information held in the transmitting apparatus 1. It is not yet the time of program provision, so that meaningless values are transmitted for the file name and the key. The transport packet is attached with a PCR.

When the program provision time of time t22 (in this example, 19:00) has been reached, the transmitting apparatus 1 transmits in the data stream the file name for program X and the encryption key used for encrypting the stream file, in addition to the time information.

When a program switching time of time t23 (in this example, 21:00) has been reached, the transmitting apparatus 1 switches the information to be transmitted to the file name and encryption key corresponding to program Y. Namely, subsequent to time t23, the transmitting apparatus 1 transmits in the data stream the time information, the file name of program Y, and the encryption key used for encrypting the stream file of program Y. At time t24, the transmission of the time information and other information comes to an end.

On the side of the receiving apparatus 3, if the user selects a preloaded program channel on the basis of the EPG information or news and magazine information before starting the program concerned, the receiving apparatus 3 performs the above-mentioned operation in the like manner at the specified time on the basis of a timer operation for example.

The receiving apparatus 3 references the EPG information to determine whether or not the program is a preloaded program. If the program is found not a preloaded program, this program is processed in the conventional manner. If the program is found a preloaded program, then the receiving apparatus 3 instructs the tuner to select the preloaded data stream. In this stream, the time and key data are transmitted. The time information contains current time, program start time, the file name for use in the program concerned, and the decryption key.

At the same time, the PCR extracted from the transport packet concerned is used to synchronize the clock of the receiving apparatus 3 with the clock of the broadcast station.

The receiving apparatus 3 computes the difference between the current time and the program start time. The computed difference denotes a elapsed time from the start of the program. Hence, a position after skipping by the computed time is searched for from the beginning of the file stored in advance to start reproduction from the found skip position.

By use of the elapsed time and "information of positional information file," the receiving apparatus 3 obtains the position corresponding to the current time in the stream file. The data are read from the corresponding position in the stream file, the data are decrypted, and the decrypted data are decoded to output video and audio signals. Thus, each preloaded stream file stored in the receiving apparatus 3 is synchronized with the clock transmitted from the broadcasting station to be reproduced.

The following describes the format of EPG data. Shown below is the format of EPG data as a table 1.

TABLE 1 for EPG

| | No. of Bits |
|---|---|
| payload( ) { | |
| num_of_ch | 8 |
| for (i=0;i<num_of_ch;i++) { | |
| num_of_programs | 8 |
| for (j=0;j<num_of_programs) { | |
| DIRECT_or_PRE-LOAD | 8 |
| month | 8 |
| day | 8 |
| start_time_hour | 8 |
| start_time_min | 8 |
| length_hour | 8 |
| length_min | 8 |
| len_program_name | 8 |
| for (i=0;i<len_program_name;i++) { | |
| program_name_data | 8 |
| } | |
| if (DIRECT_or_PRE-LOAD==DIRECT) { | |
| } | |
| if (DIRECT_or_PRE-LOAD==PRE-LOAD) { | |
| len_filename | 8 |
| for (i=0;i<len_filename;i++) { | |
| filename_data | 8 |
| } | |
| } | |
| attribute_length | 8 |
| for (j=0;j<attribute_length;j++) { | |
| attribute_data | 8 |
| } | |
| } | |
| } | |
| for (stuffing) { | |
| stuffing_byte | 8 |
| } | |
| } | |

Since the EPG is stored in the transport packet, the format is defined with a transport packet data storage portion (the portion of data_byte) being payload( ). It should be noted that each transport packet has a relatively short, 188 bytes long as a whole, so that for the transmission of the EPG data for one week, a plurality of transport packets are transmitted.

The following describes the above-mentioned EPG data format. At the beginning of payload( ), the number of channels (num_of_ch) is arranged. In payload( ), EPG data are described collectively for each channel and, subsequent to the number of channels (num_of_ch), the information about each channel is repeated by the number of channels (num_of_ch).

At the beginning of the information about each channel, the number of programs (num_of_programs) is arranged. This indicates the number of programs of EPG data included in the structure for each channel. Subsequently, the information about each program is repeated by the number of programs (num_of_programs).

At the beginning of the information about each program, a flag (DIRECT_or_PRE-LOAD) indicative of whether or not the program is directly transmitted or preloaded. Subsequently, the date on which the program is provided is represented in month (month), day (day), and start time in hour (start_time_hour) and minute (start_time_min). Subsequently, the length of the program is represented in time in hour (length_hour) and minute (length_min). Subsequently, the program name (program_name) is located.

Subsequently, the file name is arranged for a preloaded program only.

Lastly, attribute data are located. These attribute data include program explanation for example. If all the above-mentioned information does not fill up payload( ), then it is filled with stuffing bytes.

The following describes the control commands which are transmitted in a preload control stream. Shown below is the format of the control commands as a table 2.

TABLE 2

Control commands

| | No. of Bits |
|---|---|
| palyload( ) { | |
| command_flag | 8 |
| if (command_flag=='0000 0001' | |
| { //command 1 - all delete } | |
| if (command _flag=='0000 0010') | |
| { //command 2 - body download advance notice | |
| len_filename | 8 |
| for (i=0;i<len_filename;i++) { | |
| filename_data | 8 |
| } | |
| size | 64 |
| } | |
| if (command_flag=='0000 0011' | |
| { //command 3 - positional information download advance notice | |
| len_filename | 8 |
| for (i=0;i<len_filename;i++) { | |
| filename_data | 8 |
| } | |
| size | 64 |
| } | |
| for (stuffing) { | |
| stuffing_byte | 8 |
| } | |
| } | |

Since the above-mentioned control commands are stored in each transport packet and transmitted, the format is defined with the transport packet data storage section (the portion of data_type) being payload( ). It should be noted that each transport packet has a relatively short construction, 188 bytes in total and each command defined here is smaller than 188, so that one transport packet is occupied by one control command, the remaining portion of payload( ) is filled with stuffing bytes.

The following describes the formats of the above-mentioned control command. At the beginning of payload( ), information indicative of the type of this command (command_flag) is arranged. If the value command_flag is '00000001,' it indicates the "all delete command; if the value is '00000010,' it indicates the "body download advance notice"; and if the value is '00000011,' it indicates the "positional information download advance notice."

Since the "all delete command" (command_flag='00000001') has no argument, payload( ) of this transport packet is filled with stuffing bytes.

In the case of "body download advance notice command" (command_flag='00000010'), the file name (len_filename and filename_data) and its size (size) are arranged, the remaining portion being filled with stuffing bytes.

In the case of "positional information download advance notice command" (command_flag='00000011'), the file name (len_filename and filename_data) and its size (size) are arranged, the remaining portion being filled with stuffing bytes.

The following describes the formats of signals which are transmitted in the data stream at preloading and preloaded program provision. Shown below are the signal formats as table 3.

TABLE 3

For data/time and key

| | No. of bits |
|---|---|
| payload ( ) { | |
|    command_flag | 8 |
|    if (command_flag=='0000 1001' | |
|    {    // command 9 - download data | |
|       num_of_data | 8 |
|       for (i=0;i<num_of_data;i++) { | |
|          data_byte | 8 |
|       } | |
|    } | |
|    if (command_flag=='0000 1010') | |
|    {    // command 10 - key | |
|       PTS | 33 |
|       year | 16 |
|       month | 8 |
|       day | 8 |
|       hour | 8 |
|       minute | 8 |
|       second | 8 |
|       len_filename | 8 |
|       for (i=0;i <len_filename;i++) { | |
|          filename_data | 8 |
|       } | |
|       start_time_hour | 8 |
|       start_time_min | 8 |
|       length_hour | 8 |
|       length_min | 8 |
|       key | 128 |
|    } | |
|    for (stuffing) { | |
|       stuffing_byte | 8 |
|    } | |
| } | |

Since the above-mentioned data to be transmitted at preloading and preloaded program provision are stored in each transport packet and transmitted, each format is defined with the transport packet data storage portion (the portion of data_byte) being payload( ). It should be noted that each transport packet has a relatively short structure, 188 bytes in total, so that many transport packets are used for file downloading to transmit the data.

The following describes the above-mentioned data formats. At the beginning of payload( ), information (command_flag) indicative data type is arranged. If the value of command_flag is '0000 1001,' it indicates download data; if the value is '0000 1010,' it indicates "key and time."

In the case of "download data," command_flag is followed by the number of pieces of data (num_of_data), which is followed by the data bytes for the number of pieces of data (num_of_data). If payload( ) has still a free space so far, which is filled with stuffing bytes (stuffing).

In the case of "key and time," command_flag is followed by a PTS (Presentation Time Stamp). The PTS denotes the timing of "current time" arranged following the PTS.

Subsequently, year (year), month (month), day (day), hour (hour), minute (minute), and second (second) of the current time are arranged. Subsequently, file names (len_filename, filename_data) for use in the program concerned, start time of the program concerned (start_time_hour, start_time_min), and length of the program concerned (length_hour, length_min) are arranged. Lastly, a key (key) for decrypting the encrypted data is arranged. If the information so far still has a free space, it is stuffed by bytes (stuffing).

The following describes how to use "PTS" and "current time." The receiving apparatus 3 holds a STC synchronized with the PCR of the transport stream. This is because the clock of the transmitting apparatus 1 must be synchronized with the clock of the receiving apparatus 3. When the PTS becomes equal to the STC, it indicates the time indicated by the value of "current time," upon which the receiving apparatus 3 sets its internal clock at that moment. Also, by obtaining a difference between the current time and the start time of the program concerned, an elapsed time from the start of the program concerned can be recognized.

The following describes the format of a positional information file. Shown below is the format of a position information file as table 4.

TABLE 4

Positional information file

| | No. of Bits |
|---|---|
| location_file ( ) { | |
|    num_entry | 32 |
|    for (i=0;i<num_entry;i++) { | |
|       offset_hour | 8 |
|       offset_minute | 8 |
|       offset_second | 8 |
|       offset_frame | 8 |
|       offset_byte | 64 |
|    } | |
| } | |

The following describes the format of the above-mentioned positional information file. At the beginning, the number of entries (num_entry) is arranged, indicating the number of entries contained in the positional information file. The information for each entry contains offset from the beginning of the stream file, namely an elapsed time form the beginning, in the order of hour (offset_hour), minute (offset_min), second (offset_min), and frame (offset_frame). Lastly, a byte offset (offset_byte) from the beginning of "stream file" is arranged.

It should be noted that the entries are arranged in the order of appearance from the beginning of the stream, namely in the ascending order of time and byte offset.

The following describes the operations of the transmitting apparatus 1 shown in FIG. 8 which handles the data of the above-mentioned format. In the present embodiment, the transmitting apparatus 1 performs the broadcasting (conventional broadcasting) of programs which can be viewed on the receiving side in real time and the provision of received programs which can be viewed not in real time but when a predetermined time has been reached on the receiving side. First, the operation of the transmitting apparatus 1 at program broadcasting will be described with reference to the flowchart of FIG. 16.

In step S11, the administrator of the transmitting apparatus 1 stores the organization data as shown in FIG. 12 into the memory 12 (FIG. 8) of the control section 11. Content to be broadcast at each timing is recorded to a VTR tape, which is set to the VTR cart 14.

Although the facilities for performing live broadcasting is now shown in the transmitting apparatus 1 shown in FIG. 8, when performing live broadcasting, the outputting of video and audio signals may be started, upon reaching a predetermined time, from a broadcast recording studio (not shown) installed in parallel to the VTR cart 14, instead of setting a VTR tape recording the program to the VTR cart 14, thereby supplying the video and audio signals to the video encoder 15 and the audio encoder 16 respectively. In the following description, an example is used in which non-live broadcasting is performed.

In step S12, the control section 11 supplies the information at least one week beyond the date concerned from the organization data stored in the memory 12 to the EPG generating section 18. Therefore, the administrator of the transmitting apparatus 1 must set the organization data shown in FIG. 12 to the control section 11 (store in the memory 12) at least one week before the provision of the program concerned. The EPG generating section 18 accumulates the supplied information, converts the information into the EPG format used in the transmitting apparatus 1, and supplies the converted information to a terminal K3 of the multiplexer 17. It should be noted that any EPG may be used; therefore the EPG already in use may be used.

In step S13, the control section 11 references its internal clock 13 and, in accordance with the organization data, operates the VTR cart 14 to supply the contents of the program to the encoders. To be more specific, the control section 11 references and compares the internal clock 13 with the organization data in the memory 12 to determine a program to be reproduced next. Then, the control section 11 indicates the program name to the VTR cart 14 before the start time of the program, putting the VTR cart 14 into the reproduction standby state.

Upon reception of the indication of the program name, the VTR cart 14 identifies the VTR tape recorded with that program, loads this VTR tape into an internal video reproducing device by internal carrying device, and waits for a next instruction. Generally, during this time, another video reproducing device in the VTR cart 14 is reproducing an on-air program, and supplying the reproduction signal to the encoders.

In step S14, when the start time of this program has been reached, the control section 11 instructs the VTR cart 14 to reproduce this program. The VTR cart 14 puts the prepared VTR reproducing device into the reproduction state, making the same output signals. The video data outputted from the VTR cart 14 are supplied to the video encoder 15 to be encoded into MPEG2 video format, and the resultant video data is supplied to the terminal K4 of the multiplexer 17. The audio data outputted from the VTR cart 14 are supplied to the audio encoder 16 to be encoded into MPEG2-AAC format, and the resultant audio data is supplied to the terminal K5 of the multiplexer 17.

In step S15, instructed by the control section 11, the multiplexing control section 19 controls the multiplexer 17. To be more specific, the control section 11 supplies to the multiplexing control section 19 information including the number of programs to be simultaneously broadcast (1 in this example) and the number of video/audio streams for the program (1 each in this example), thereby determining the PID of each stream. The PID for transmitting PCR is also determined. The PID information is also supplied to the multiplexer 17. Further, the multiplexing control section 19 generates the PSI for use in the receiving apparatus 3 and supplies the generated PSI to the terminal K1 of the multiplexer 17.

The multiplexer 17 performs time-division multiplexing on the supplied signals, namely the PSI supplied at the terminal K1, the PCR supplied at the terminal K2, the EPG supplied at the terminal K3, the video stream supplied at the terminal K4, and the audio stream supplied at the terminal K5 by the MPEG2 TS (ISO013818-1) scheme.

In step S16, the output of the multiplexer 17 is added with an error correction code by the ECC/modulating section 20 and then modulated. The resultant signal is amplified by the amplifying section 21 to be radiated from the antenna 22.

While the above-mentioned broadcasting is performed, the above-mentioned preloading is performed to provide programs to the user. The following describes the operation of the transmitting apparatus 1 shown in FIG. 8 associated with preloading with reference to the flowchart shown in FIG. 17.

In step S21, the organization data associated with each program are stored by the administrator of the transmitting apparatus 1 into the memory 12 of the control section 11 along with direct-transmitted programs and preloaded programs by one week before the date of program provision. The process in step S21 is the same as that of step S11 of the flowchart shown in FIG. 16 and executed at the same time.

When storing the organization data, the control section 11 defines a unique (not duplicate) file name to each of the preloaded programs and stores this file name in the memory 12. The file names may be defined in any manner as long as they do not duplicate with each other. For example, the programs may be numbered in a sequential manner. It is assumed here that file name "program x" be defined for "program X" and file name "program y" be defined for "program Y."

Figure 16:
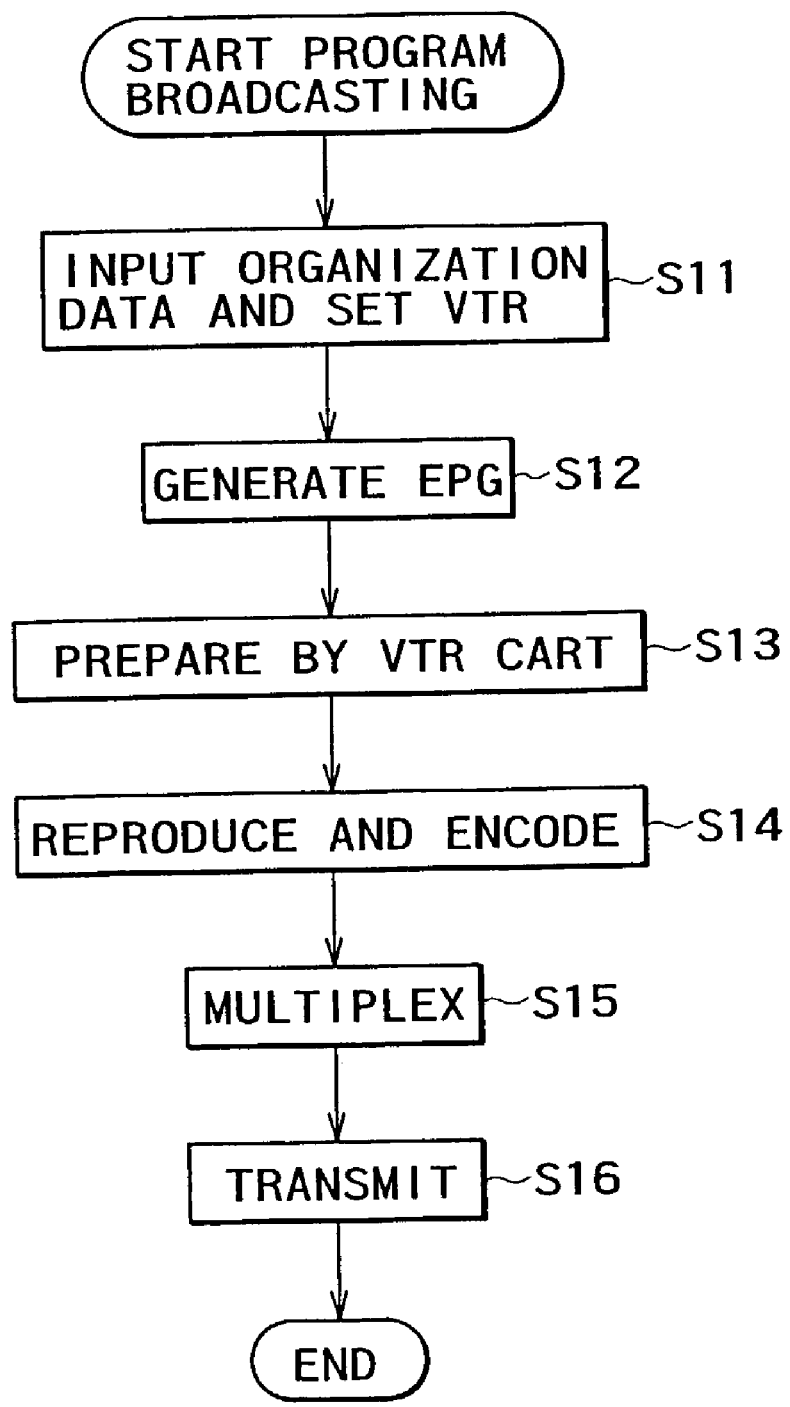
FIG. 16 is a flowchart describing a direct transmission operation to be executed by the transmitting apparatus 1.

Of the organization data stored in the memory 12, the control section 11 needs to process the organization data for channel A, the organization data for a program data to be provided in a direct-transmitted channel in this example, as described with reference to the flowchart shown in FIG. 16, while the control section 11 needs to process the organization data for channel B, namely the organization data for a program data to be provided in a preloaded channel in this example, at the same time.

Namely, in step S22, for the program to be provided in channel B, the control section 11 enters into an EPG generating section 69 the information for one week beyond the date concerned from the organization data and the file name information for preloading program stored in the memory 12. At this moment, the information of both the preloaded program (channel B) and the direct-transmitted program (channel A) is entered. The EPG generating section 69 accumulates the entered information, converts the information into the above-mentioned EPG format, and supplies the resultant information to the terminal K6 of the multiplexer 17.

By use of the predetermined PID value for a new EPG, the multiplexer 17 stores the EPG information supplied to the terminal K6 into the transport packet and multiplexes the EPG information with other input signals to output the information. The other input signals include the data of the direct-transmitted program being broadcast at that moment.

Thus, the EPG generated in the transmitting apparatus 1 includes the EPG generated by the EPG generating section 18 and the EPG generated by the EPG generating section 69. Namely, in order to provide compatibility with any receiving apparatus, having no device for storing program data, such as a hard disk, there are provided the conventional EPG generated by the EPG generating section 18 and the EPG generated by the EPG generating section 69 in the corresponding receiving apparatus.

The output from the multiplexer 17 is supplied to the ECC/modulating section 20 to be added with an error correction code and modulated. The output from the ECC/modulating section 20 is supplied to the amplifying section 21 to be amplified in electric power and the amplified signal is outputted from the antenna 22 as a radio wave. By repetitively executing the above-mentioned processing, the organization data are transmitted as EPG data at predetermined intervals from one week before the date of program provision to the time of provision. The receiving apparatus 3 presents the received EPG data to the user for use in applications such as program presetting for example.

In step S23, as described with reference to FIG. 13, the administrator of the transmitting apparatus 1 accommodates in the VTR cart 61 the VTR tape recorded with the contents of preloaded program by 9:00 on the day before the day of program provision. In this example, two VTR tapes corresponding to two programs "program X" and "program Y" are prepared by 9:00 on October 9, which are accommodated in the VTR cart 61 dedicated to preloading.

In step S24, the encoding of the preloaded program starts from 9:00 on the day before the day of program provision. First, the control section 11 determines the bit rate of each program. In this case, it is assumed that the encoding is executed with a fixed bit rate of 24 Mbps for each of the programs (in this example, two programs).

The control section 11 specifies bit rates of 22 Mbps and 0.3 Mbps for example for the video encoder 62 and the audio encoder 63. The remainder of 24 Mbps is consumed by a multiplexing overhead for example, and the remainder thereof is stuffed by bytes.

The control section 11 instructs the video encoder 62 and the audio encoder 63 to prepare for encoding. At the same time, the control section 11 instructs the VTR cart 61 to reproduce the contents of "program X."

Further, the control section 11 instructs the server 65 to store the output from the multiplexing section 64 as "program X.pre" and the output from the intra-picture detecting section 66 as "program X.cpi."

The contents of program X reproduced by the VTR cart 61 are encoded by the video encoder 62 into MPEG2 video format and by the audio encoder 63 into MPEG2 AAC format, and the resultant contents are supplied to the multiplexing section 64.

The multiplexing section 64 performs time-division multiplexing on the inputted video stream and audio stream by MEPG2 TS. At this moment, a predetermined value is applied to the PID of each transport packet for transporting each stream. The stream file which is the output from the multiplexing section 64 is supplied to the server 65 and stored therein with a predetermined file name "program x.pre."

The output from the multiplexing section 64 is also supplied to the intra-picture detecting section 66. The intra-picture detecting section 66 analyzes the supplied multiplexed stream to detect an intra-picture position, thereby creating the above-mentioned "positional information file." The created positional information file is supplied to the server 65 and stored therein with file name "program x.cpi."

When the encoding of "program X" has been completed, the control section 11 starts encoding "program Y," the next program. The encoding of "program Y" is performed in the same manner as "program X"; eventually, the stream file is stored in the server 65 with file name "program y.pre" and the positional information file is stored with file name "program y.cpi."

The control section 11 performs the above-mentioned processing on all preloaded programs. In this case, there are two preloaded programs, so that the processing is performed on two programs "program X" and "program Y." The encoding of the preloaded programs has been preferably completed at least by the day before the day of provision.

It should be noted that the encoding may be performed with average different bit rates on different programs. By setting the importance of program and required picture quality for example to the control section 11 by the administrator, the control section 11 may instruct the video encoder 62 and the audio encoder 63 to use the different bit rates.

It should be noted that the encoding of variable rates may be performed in one program. In this type of encoding, a program in its entirety is once supplied from the VTR cart 61 to the encoders (the video encoder 62 and the audio encoder 63) to detect (or determine) the difficulty of each scene and then the program in its entirety is supplied to the encoders again for encoding, the detail description of this type of encoding being skipped. For the type of encoding, the method disclosed in Japanese Patent Laid-open No. Hei 6-153152 may be applied for example.

In step S25, preloading starts. Namely, the preloading of a preloaded program to the receiving apparatus 3 starts from 0:00 the day of program provision (the day on which the user can view the program). The preloading processing is performed in the same manner as described with reference to FIG. 14.

To transmit a preloaded program, two streams on the transport stream are used in the present embodiment. One stream is the control stream which is used for controlling preloading. In the transmitting apparatus 1 shown in FIG. 8, the control section 11 generates this stream and supplies it to the terminal K7 of multiplexer 17 to be multiplexed with the transport stream.

The second stream is the data stream. In the transmitting apparatus 1 shown in FIG. 8, at preloading, "stream file" and "positional information file" are supplied from the server 65 to the terminal K8 of the multiplexer 17 through the encrypting section 67 to be multiplexed with the transport stream. At program provision, the control section 11 generates the clock and the key, which are supplied to the terminal K8 of the multiplexer 17 to be multiplexed with the transport stream.

As described with reference to FIGS. 10A through 10C, in time zone from 0:00 to 6:00, the band of channel A, namely the channel of the program to be broadcast so as to be viewable in real time, is 8 Mbps. To realize this situation, the control section 11 instructs the video encoder 15 to change the bit rate to 6 Mbps for example. This value is obtained so that the band of the channel A becomes 8 Mbps including the output, multiplexing overheads and the like of the audio encoder 16. Consequently, the band for preloading can be allocated by 16 Mbps (=24 Mbps−8 Mbps).

When preloading starts in step S25, "all delete command" is transmitted in the control stream in step S26. To be more specific, the control section 11 generates "all delete command." "All delete command", is one of the control commands described with reference to Table 2, with the value of "command_flag" set to "0000 0001" with the remaining portion filled with stuffing bytes. The control section 11 supplies the generated "all delete command" to-the terminal K7 of the multiplexer 17.

By use of the preset PID value for the control stream, the multiplexer 17 stores the control stream supplied to the terminal K7 into transport packets.

It should be noted that the multiplexer 17 and the multiplexing control section 19 perform the same operations as those conventionally performed as described with reference to FIG. 2. To be more specific, the data supplied to the terminals K1 through K8 are time-division multiplexed with each other by MPEG2 TS. These data are those of a program (a direct-transmitted program) which is viewable in real time.

Hence, the multiplexed control stream information, "all delete command" in this case, is multiplexed with other input signals to be outputted from the multiplexer 17. The output from the multiplexer 17 is supplied to the ECC/modulating section 20, the amplifying section 21, and the antenna 22 in this order to be transmitted therefrom. In what follows, the processing for the stream outputted from the multiplexer 17 is the same as described above and therefore its description will be skipped.

In a period from the transmission of "all delete command" to the passing of a predetermined time, the control section 11 does not start the process of next step. This wait time is 30 seconds or one minute for example, which is long enough for deleting the data stored in the storage device in the receiving apparatus 3 by executing (receiving) the "all delete command" in the receiving apparatus 3. This wait time is counted by the clock 13 in the control section 11.

Next, the transmission of a preloaded program is executed. First, in step S27, "body download advance notice" command is transmitted in the control stream. To be more specific, the control section 11 generates "body download command." "Body download command" is one of the control commands described with reference to Table 2, with "command_flag" value set to "0000 0010."

The control section 11 describes, in this control command, the file name (file_name) of "stream file" to be downloaded (transmitted), "image x.pre" in this example, and the size (size) of this file. The remaining portion is filled with stuffing bytes. Then, the control section 11 supplies the generated "body download command" to the terminal K7 of the multiplexer 17.

Like the above-mentioned "all delete command," the multiplexer 17 multiplexes the supplied command with other input signals and outputs the multiplexed signal. After transmitting the "body download command," the control section 11 waits for a predetermined time to pass. This time is set to a value enough for storing the downloaded data into the storage device in the receiving apparatus 3.

In step S28, the transmitting apparatus 1 transmits "stream file" in the data stream. To be more specific, the control section 11 first generates a key for encryption. This process is performed by use of a subroutine for random number generation incorporated in the control section 11, for example. A different encryption key is generated every time. It should be noted that this key is kept stored in the memory 12 until the end of program provision (in this case, 21:00 for program X and 23:00 for program Y).

The control section 11 supplies the generated encryption key to the encrypting section 67 and puts the encrypting section 67 into the state of waiting for data from the server 65. At the same time, the control section 11 makes settings so that the switch 68 is connected to terminal b in order to supply encrypted data to the terminal K8 of the multiplexer 17.

Next, the control section 11 instructs the server 65 to output the stream file of "program X", namely the file having file name "program x.pre", to the encrypting section 67. The server 65 supplies the contents of the specified file to the encrypting section 67. At this moment, the bit rate of the output from the server 65 is set to a value obtained by subtracting the multiplexing overhead from the bit rate of 16 Mbps allocated for preloading. The control section 11 specifies the output bit rate for the server 65.

Another method may be used in which, without limiting the output rate of the server 65 and with the output rate of the multiplexer 17 left set to 24 Mbps, the entire band remaining after multiplexing the inputs from other than the terminal K8 is allocated to the data supplied to the terminal K8.

The encrypting section 67 encrypts the data supplied from the server 65 by use of the encryption key supplied from the control section 11. Any encryption scheme may be used. It should be noted that, in the following description, assumption is made that the size (size) of content remain unchanged after encryption. The data encrypted by the encrypting section 67 are supplied to the terminal K8 of the multiplexer 17 via the terminal b of the switch 68.

By use of the predetermined PID value for the data stream, the multiplexer 17 stores the data stream supplied to the terminal K8, the encrypted stream file in this case, into a transport packet and multiplexes stream file with other inputted data to output the multiplexed data stream file.

The transport packet storing the stream file has one of the "data/time and key formats" described with reference to Table 3, with the value of "command_flag" set to "0000 1001." Command_flag is followed by the number of pieces of data (num_of_data) of the stream file stored in this transport packet, which is followed by the data body (data_byte). If payload( ) has still a free space, it is filled with stuffing bytes.

The above-mentioned processing is repeated until the entire stream file is transmitted.

When the transmission of the stream file (the data of program body) has been completed, then the procedure goes to step S29, in which the transmitting apparatus 1 transmits "positional information download advance notice" command in the control stream. To be more specific, the control section 11 first generates "positional information download command." "Positional information download command" is one of the control commands described with reference to Table 2, with the value of "command_flag" set to "0000 0011."

Next, the control section 11 describes the file name of "positional information file" to be download, "program x.cpi" in this example, and its size (size) The remaining portion is filled with stuffing bytes. The control section 11 supplies the generated "positional information download command" to the terminal K7 of the multiplexer 17.

The multiplexer 17 multiplexes the supplied command with other input data and outputs the multiplexed data. After transmitting "positional information download command," the control section 11 waits for a predetermined time to pass.

When the predetermined time has passed, the control section 11 starts transmitting the positional information file in step S30. In step S30, the transmitting apparatus 1 transmits "positional information file" in the data stream. Namely, first, the control section 11 instructs the encrypting section 67 to output the input signal supplied from the server 65 without change. At the same time, the control section 11 sets the switch 68 to connect to the terminal b so that the signal outputted from the encrypting section 67 is supplied to the terminal K8 of the multiplexer 17.

It should be noted that another configuration may be used in which a switch is arranged between the server 65 and the encrypting section 67 for switching the output from the server 65 to the terminal b of the switch 68 via the encrypting section 67 or to the terminal b of the switch 68 without passing through the encrypting section 67, thereby selecting whether or not the encryption by the encrypting section 67 is to be performed.

In addition to the above-mentioned process in step S30, the control section 11 instructs the server 65 to output the positional information file for "program X," namely the file having file name "program x.cpi," to the encrypting section 67. The server 65 supplies the contents of the specified file to the encrypting section 67.

The output bit rate of the positional information file from the server 65 is also set in the same manner as the above-mentioned data transmission of the program body (in this example, the transmission of file "program X.pre"), so that its description will be skipped.

By use of the predetermined PID value for the data stream, the multiplexer 17 stores the data stream supplied to the terminal K8, the positional information file not encrypted in this example, into a transport packet and multiplexes this file with other input signals to output the multiplexed signal.

The transport packet for storing the positional information file is one of "data/time and key formats" described with reference to Table 3, with "command_flag" set to "0000 1001." This is followed by the number of pieces of data (num_of_data) of the positional information file stored in this transport packet, which is followed by the data body (data_byte). If payload( ) has still a free space, it is filled with stuffing bytes. This processing is repeated until the entire positional information file has been transmitted.

The transmission of stream file "program X.pre" and positional information file "program x.cpi" constituting one "program X" to be preloaded is completed by the above-mentioned sequence of processing operations.

When the transmission of the data (the data of program body and the data of positional information file) associated with one program has been completed, then, in step S31, it is determined whether or not the transmission of all programs to be preloaded has been completed. This determination is made by referencing the organization data stored in the memory 12 by the control section 11.

In this case, there are two programs to be preloaded, so that it is determined in step S31 that the transmission of all programs has not yet been completed, upon which the procedure returns to step S27, in which the above-mentioned processing is repeated for "program Y." Since the data associated with "program Y" are transmitted in the same manner as the above-mentioned data associated with "program X," its description will be skipped.

Figure 17:
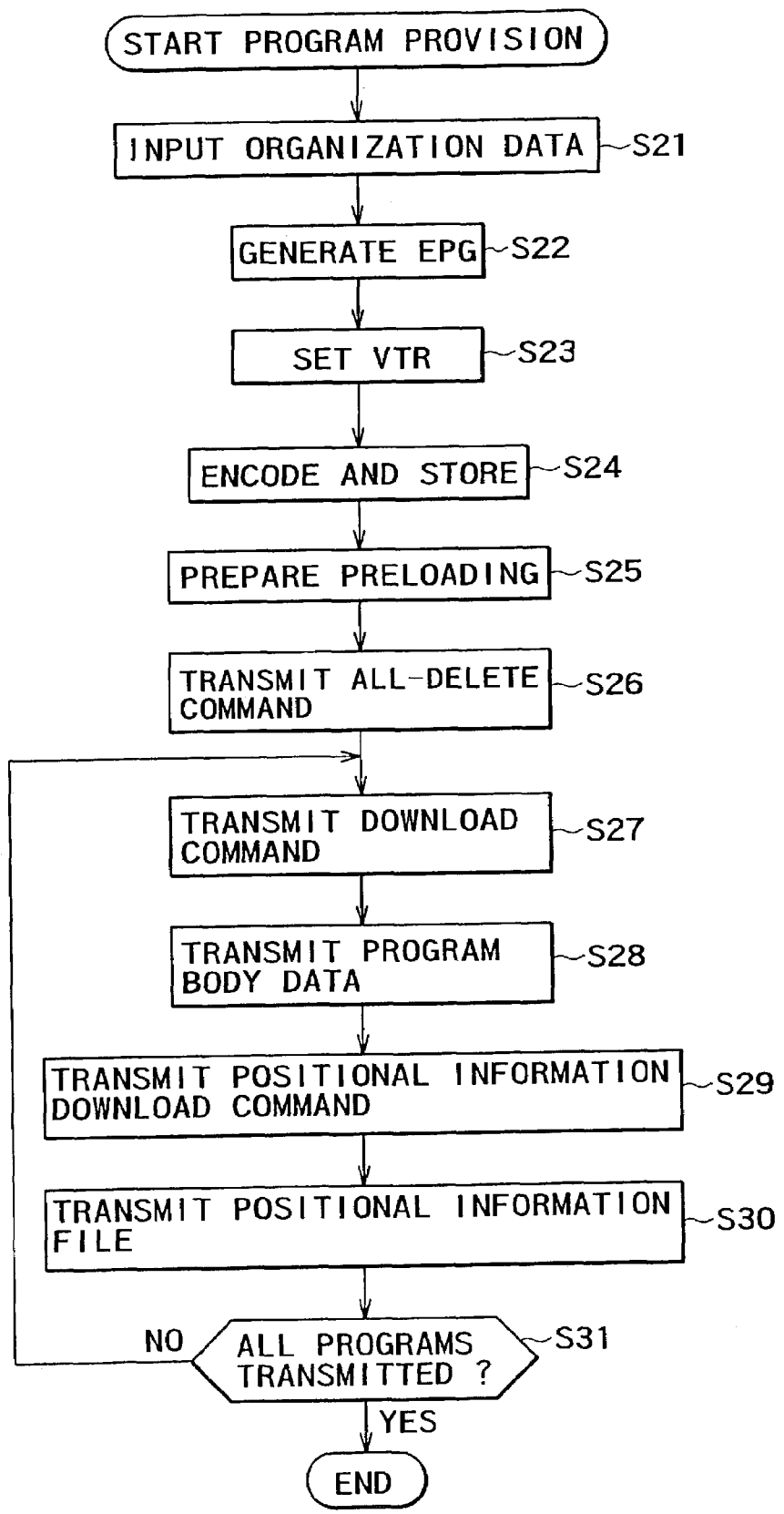
FIG. 17 is a flowchart describing a preloading operation to be executed by the transmitting apparatus 1.

On the other hand, if the transmission of all programs is found completed in step S31 by referencing the organization data by the control section 11, then the processing for preloading shown in the flowchart of FIG. 17 comes to an end. It should be noted that the processing for preloading shown in FIG. 17 must be completed by about 6:00 of the day on which these programs become viewable to the user as described above (namely, within the time in which the band is allocated for the preloaded programs).

The data associated with the preloaded programs as described above are then stored in the storage device of the receiving apparatus 3. However, it is undesirable in terms of operation from the viewpoint of copyright protection if this storage device is removed to be connected to another apparatus for unauthorized viewers to view programs or make viewable outside the authorized viewable time zone (from 19:00 to 23:00 in this example).

Therefore, in the present embodiment, the data of the body of each program to be preloaded (in this example, the data of "program X.pre" and "program Y.pre") are encrypted by the encrypting section 67 before transmission and the receiving apparatus 3 stores the encrypted data. This configuration prevents the above-mentioned problem from occurring.

Figure 18:
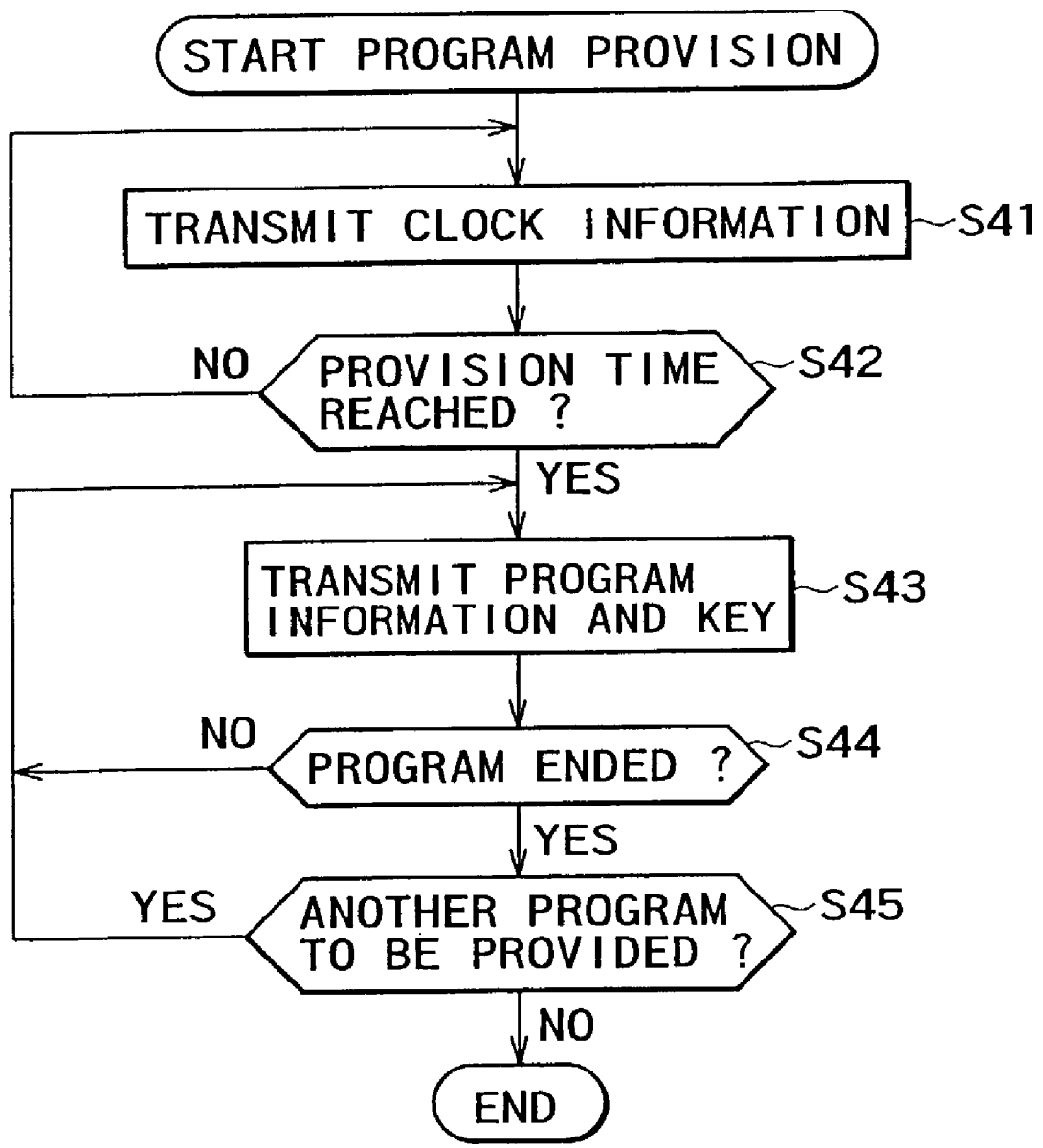
FIG. 18 is a flowchart describing an operation for the transmitting apparatus 1 to provide preloaded programs.

However, the encrypted data alone cannot make the programs viewable when the predetermined viewable time has been reached. The following describes the operation of the transmitting apparatus 1 to be performed in the viewable time zone (from 19:00 to 23:00) with reference to the flowchart shown in FIG. 18.

In step S41, the transmitting apparatus 1 transmits "time information" in the data stream immediately before the time of preloaded program provision (time t21) as shown in FIG. 15. Namely, the control section 11 first generates the data for time and key. The structure of the transport packet to be used at this moment is one of the data/time and key formats described with reference to Table 3, with the value of first "command_flag" set to "0000 1010.".

Next, the control section 11 sets time information. The control section 11 reads the value of the internal clock 13 and makes a time at which the places (digits) less than "second" caused 10 seconds after that point of time become 0, namely a time at which the places (digits) of "second" carries become "time information" and the MPEG2 PCR definition of "time information" become "PTS."

The following describes "a time at which the places (digits) less than "second" caused 10 seconds after that point of time become 0" in detail. In the present embodiment, the time information indicated in the above-mentioned data/time and key format is set down to "second places (digits)" and therefore does not represent any value less than "second." Therefore, the places (digits) smaller than second represent a time indicative of all "0"s, namely, just "XX second."

In this example, the time information down to "second" places (digits) exists, so that the time is used in which any time "less than second" is 0. However, times other than "less than second" may be used depending on the settings; namely, the places (digits) smaller than the existing (set) places (digits) may all become 0.

In this example, "10 seconds after" is used in consideration of the time necessary for executing the processing in the multiplexer 17, the ECC/modulating section 20, and amplifying section 21 after generating the time information in the control section 11 and the time necessary for processing the received time information in the receiving apparatus 3. Therefore, the time information may not be a value "10 seconds"; namely, the time information may be set to an appropriate value depending on the characteristics of each broadcasting system or the transmitting apparatus 1.

"Time information" includes values such as year 2000 (year), October (month), 10 (day), 18:00 (hour), 49 minutes (minute), and 50 seconds (second). The PTS indicates, in a PCR value, the time represented in "time information."

At this point of time, "file name corresponding to program," "start time," "program length," and "encryption key" are not transmitted. Namely, in the above-mentioned data/time and key format, the length of file name (len_filename) is set to 0 and the data body of file name (filename_data) is not transmitted. Program start time (start_time_hour, start_time_min) and the program length (length_hour, length_min) are also set to 0. In addition, "key" value is set to 0. The data having these settings are transmitted.

The control section 11 supplies the generated time and key data to the terminal K7 of the multiplexer 17. The multiplexer 17 uses the predetermined PID value for the control stream to store the data supplied to the terminal K7 into a transport packet, multiplexes the stored data with other input signals, and outputs the multiplexed signal.

In step S42, it is determined whether or not the program provision time has been reached. If the program provision time is found not reached in step S42, then the procedure returns to step S41 to repeat the above-mentioned processing therefrom. On the other hand, if the program provision time is found reached in step S42, then the procedure goes to step S43.

Namely, as described with reference to FIG. 15, until time t22 has been reached, the control section 11 continues to transmit the time information at certain time intervals. The control section 11 generates the time information at certain time intervals and transmits the generated time information in the control stream as time and key data. When time t22 has been reached, the procedure goes to step S43 to start transmitting the program information and key.

When time t22, or the time of providing preloaded program "program X", has been reached in step S43, the control section 11 adds the information about "program X" to the data to be transmitted. Namely, "program X" is put in "file name corresponding to program." At this moment, value "3" is put in len_filename and filename_data which appears three times has values "ban," "gumi," and "X" respectively. Since the program start time is 19:00, "19" is put in "start_time_hour" and "0" is put in start_time_min.

Further, since the length of program is two hours, "2" is put in length_hour and "0" is put in "length_min." The encryption key used for preloading "program X" is put in key (key). The control section 11 supplies the time and key data thus generated to the multiplexer 17 to transmit the multiplexed data.

Until time t23 has been reached, the control section 11 continues transmitting the time and key information for "program X" at certain time intervals. The control section 11 generates the time information at certain time intervals, adds the program information thereto, and transmits the resultant data in the control stream as time and key data.

In step S44, it is determined whether or not the program (in this example, program X) has ended. In this case, this processing is performed by the control section 11 by referencing the internal clock 13 to determine whether or not 21:00 has been reached. If the program is found not ended in step S44, then the procedure returns to step S43 to repeat the above-mentioned processing therefrom.

On the other hand, if the program is found ended in step S44, then the procedure goes to step S45 to determine whether or not there is another program to be provided. In this example, there is "program Y," so that the decision is YES, upon which the above-mentioned processing from step S43 is repeated. The same processing as for "program X" is performed on "program Y," so that its description will be skipped.

In this example, the above-mentioned processing is performed on both "program X" and "program Y," so that, if no next program is found in step S45, or if time t24 (FIG. 15) is found reached, the control section 11 stops transmitting the time and key information. As described with reference to FIG. 15, this event ends at 23:00.

The following describes the receiving apparatus 3 which receives the direct-transmitted programs (the transmitted programs which are viewable in real time on the receiving apparatus 3) and the preloaded programs (the programs which are transmitted in advance and become viewable at a predetermined time).

Figure 3:
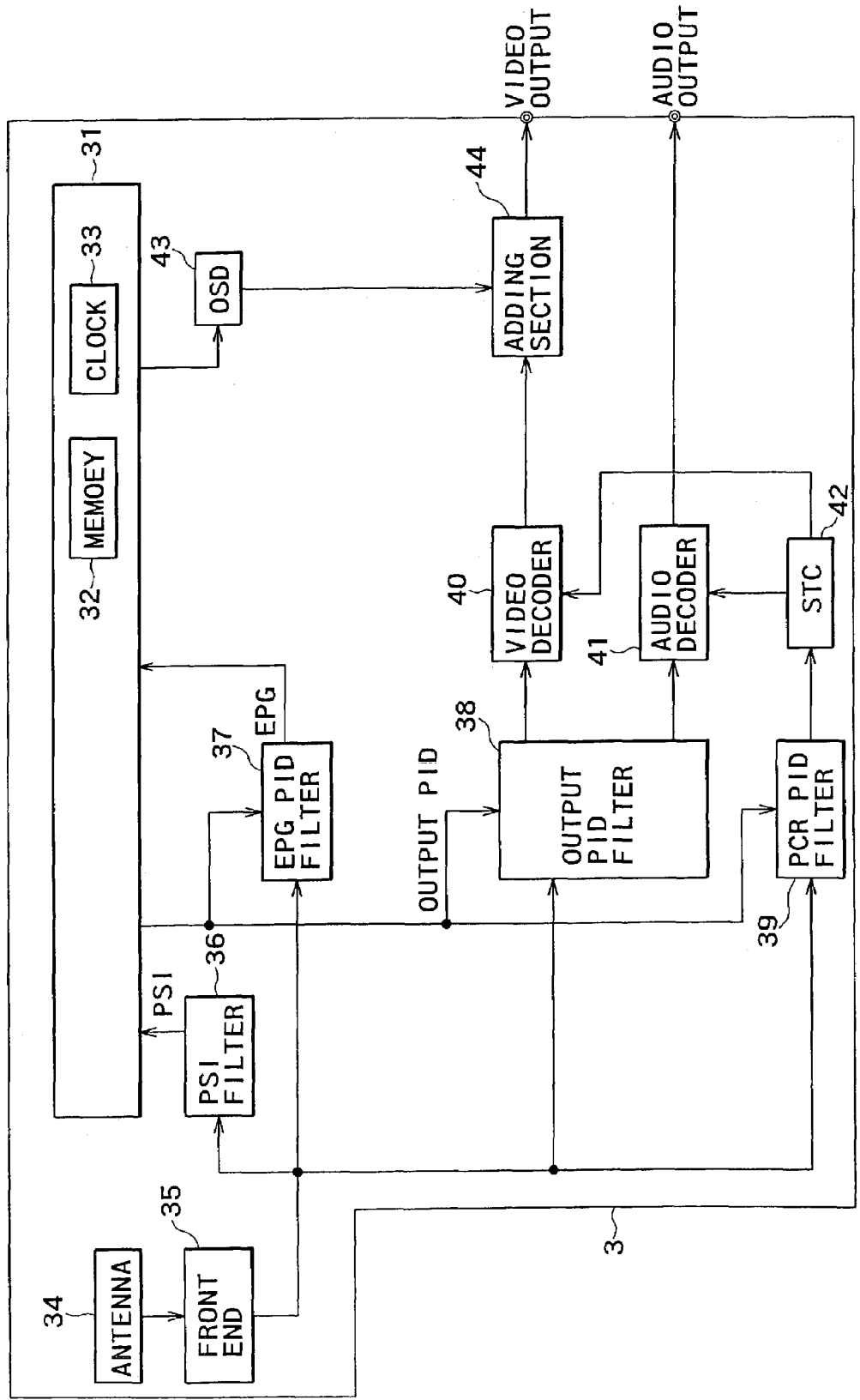
FIG. 3 illustrates an exemplary internal configuration of a prior-art receiving apparatus 3.
Figure 4:
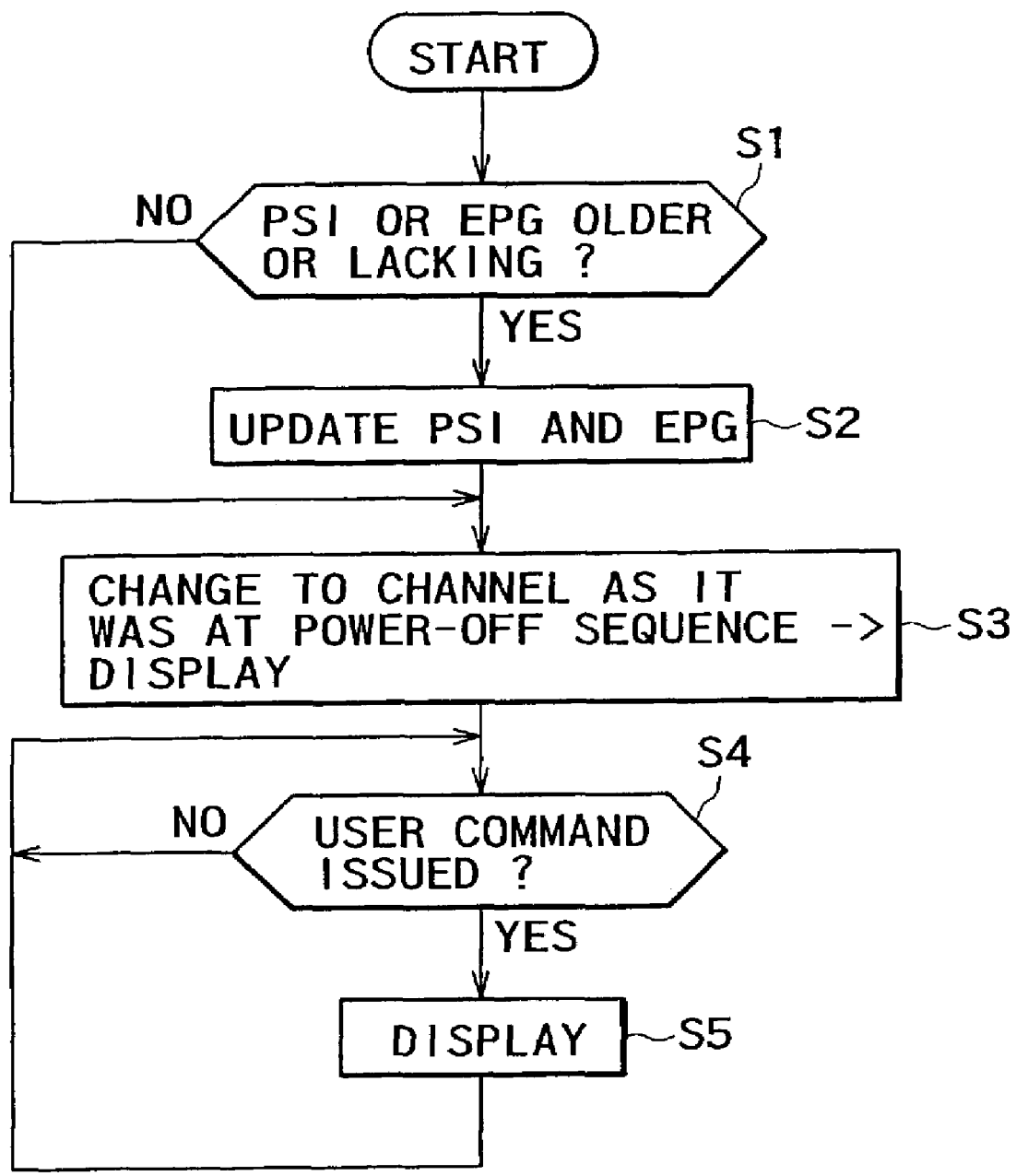
FIG. 4 is a flowchart describing an operation of the receiving apparatus 3 shown in FIG. 3.
Figure 19:
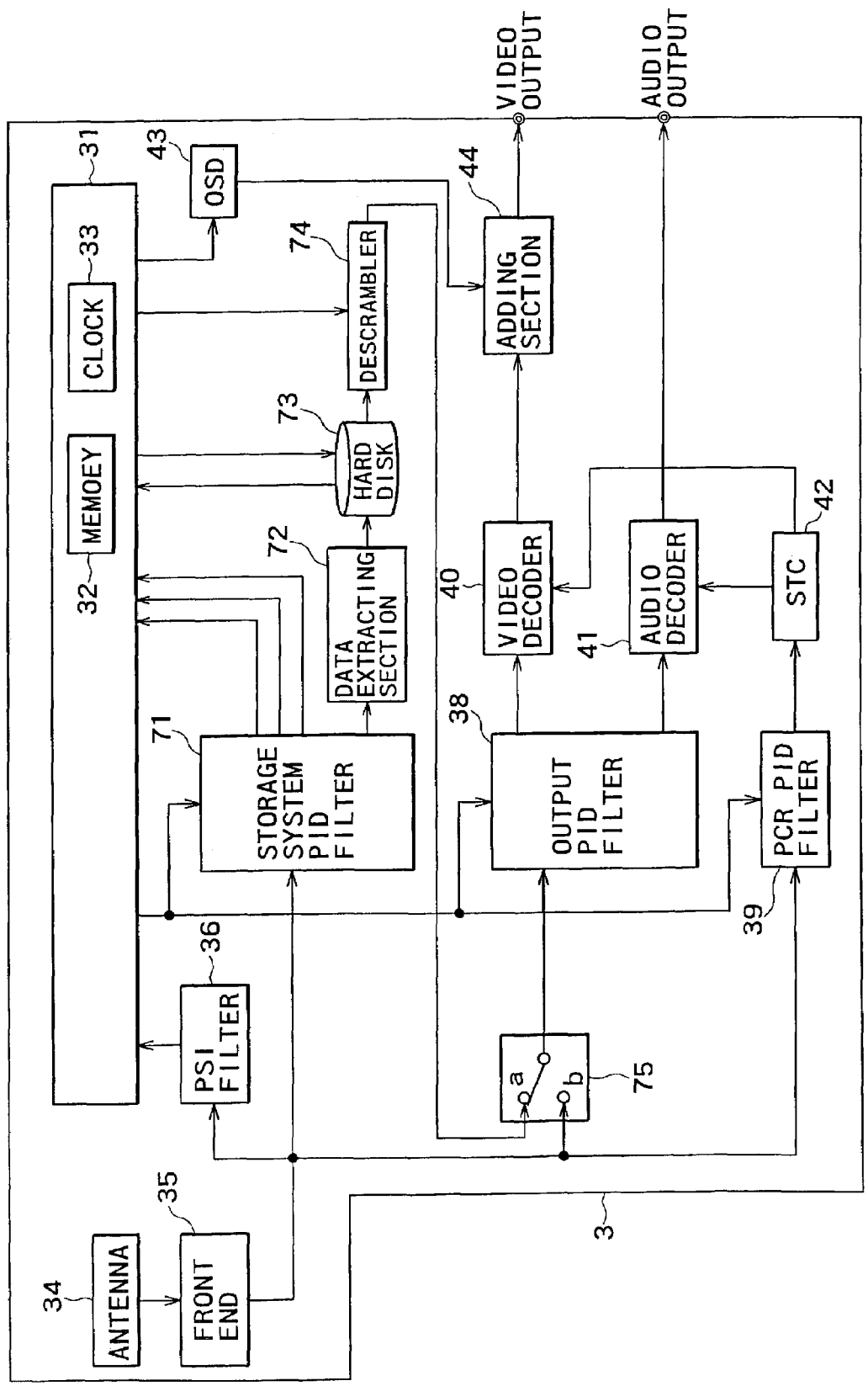
FIG. 19 illustrates an exemplary internal configuration of a receiving apparatus 3 practiced as one embodiment of the present invention.

FIG. 19 shows an internal configuration of the receiving apparatus 3 practiced as one embodiment of the present invention. With reference to FIG. 19, components similar to those previously described with FIG. 3 are denoted by the same reference numerals and their descriptions will be omitted as appropriate. Comparison between the receiving apparatus 3 shown in FIG. 3 (prior-art) and the receiving apparatus 3 shown in FIG. 19 (present invention) indicates that the receiving apparatus 3 shown in FIG. 19 has a storage-system PID filter 71 in place of the EPG PID filter 37 of the receiving apparatus 3 shown in FIG. 3.

In what follows, the EPG handled by the prior-art EPG PID filter 37 is referred to as "old EPG" and the EPG handled by the storage-system PID filter 71 is referred to as "new EPG" so as to distinguish them as required.

The storage-system PID filter 71 extracts, from the supplied transport stream, the transport packet including the control stream, the new EPG, and the data stream (time and key data and content data). The control stream, the new EPG, and the time and key data in the data stream are supplied to the control section 31. The stream file and positional information file in the data stream are supplied to a hard disk 73 via a data extracting section 72. The PID of the transport packet containing these pieces of information is given by the control section 31.

The storage-system PID filter 71 is shown here as one filter. It also may have a configuration shown by a plurality of block diagrams or may be constituted with other functional components.

The hard disk 73 arranged in the receiving apparatus 3 as a storage device stores, under the control of the control section 31, the stream file and positional information file supplied from the storage-system PID filter 71 via the data extracting section 72. The positional information file is used by the control section 31. The stream file is supplied from the hard disk 73 to a descrambler 74 under the control of the control section 31.

The descrambler 74 decrypts the supplied stream file by the key given by the control section 31 and supplies the decrypted stream file to the terminal a of a switch 75. The input into the output PID filter 38 is the data of one of the received transport stream from the front end 35 (terminal b) and the temporarily stored stream file from the descrambler 74 (terminal a), which are switched therebetween by the switch 75.

Unless instructed by the control section 31, the switch 75 is not connected to the terminal a side. The control section 31 controls the switch 75 so that it is connected to the terminal a side only during a period in which a preloaded program (a program stored in the hard disk 73) is viewable.

Figure 20:
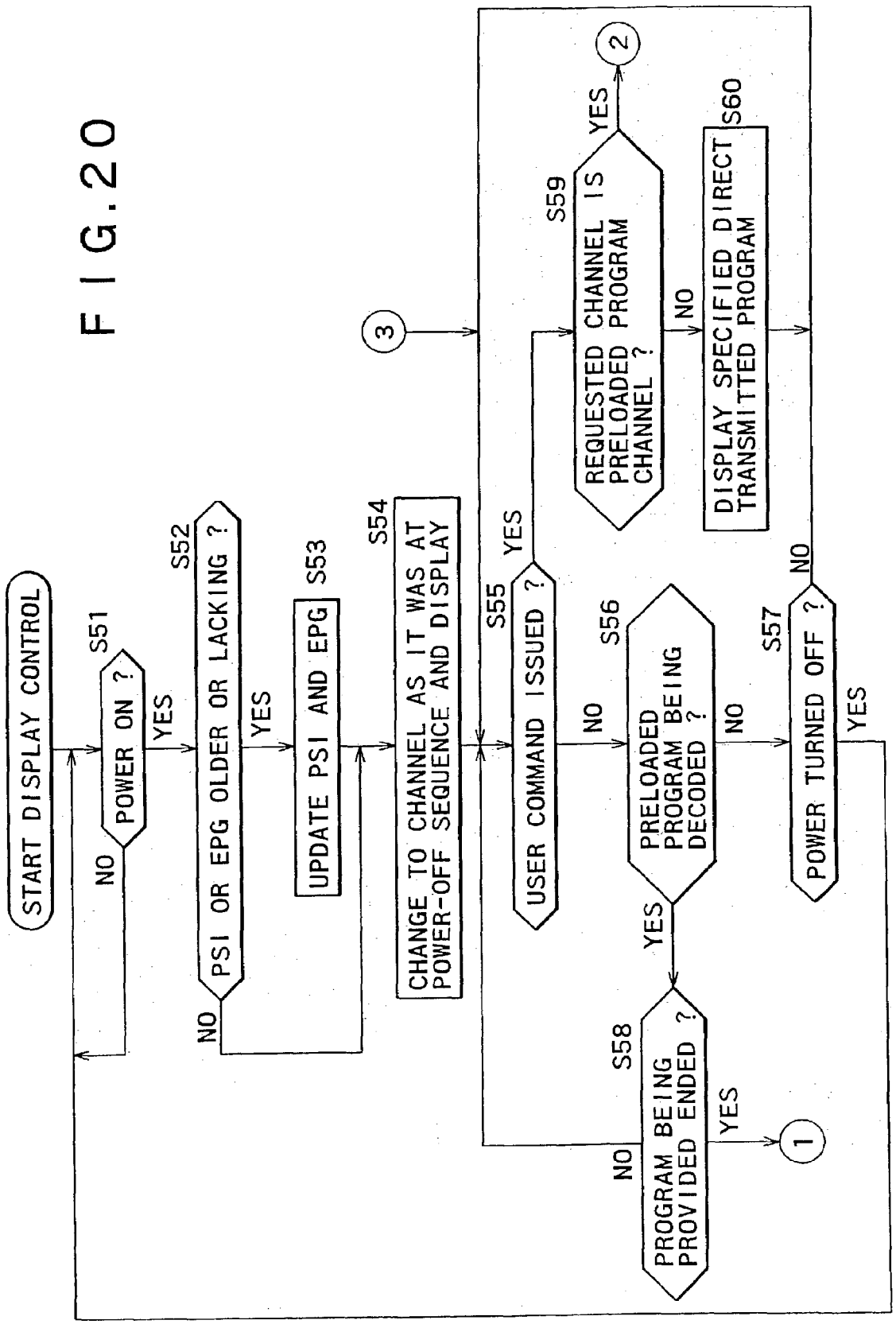
FIG. 20 is a flowchart describing a display control operation to be executed by the receiving apparatus 3.

The following describes the operation of the receiving apparatus 3 shown in FIG. 19. The control section 31 of the receiving apparatus 3 is executing two processes at a time. One is display control and the other is preloaded data reception control. The following first describes the display control of the two processes running at a time with reference to the flowcharts shown in FIG. 20 and FIG. 21.

In step S51, the control section 31 determines whether or not the viewer not shown has turned on (power on) the power switch by operating a button (not shown) of a remote controller (not shown) or the receiving apparatus 3. It should be noted that the receiving apparatus 3 has already started operating at supplying of the power, so that the power switch in step S51 is used to perform a display operation. If the power switch is found turned on, the procedure goes to step S52; if the power switch is found not turned on, the procedure returns to step S51 to repeat the above-mentioned processing therefrom (the standby state is continued).

In step S52, it is determined whether or not at least one of the PSI information and the "new EPG" information stored in the memory 32 of the control section 31 is lacking or obsolete. If one or both of the PSI and new EPG are found lacking or obsolete in step S52, then the procedure goes to step S53; if the decision is otherwise (both the PSI and EPG are enough), then the procedure goes to step S54 by skipping step S53.

The decision in step S52 is performed by comparing the PSI and EPG information in the memory 32 with the date indicated by the clock 33 by the control section 31.

In step S53, the control section 31 instructs the front end 35 to receive a default channel. The default channel is set to the receiving apparatus 3 in advance. In the present embodiment, the default channel is channel A of direct transmission (if there are two or more direct-transmitted channels, any channel may be used as default). The front end 35 tunes in the frequency/band on which the default channel is transmitted, demodulates the signal, performs error correction on the signal by use of error correction code, and outputs the processed data as a transport stream.

The transport stream outputted from the front end 35 is supplied to the PSI filter 36 and the storage-system PID filter 71. The transport stream is also supplied to the PCR PID filter 39 and the output PID filter 38 via the switch 75. However, in the process of step S53, the transport stream supplied to the PCR PID filter 39 and output PID filter 38 are not processed.

The PSI filter 36 extracts the PSI information from the supplied transport stream and supplies the extracted PSI information to the control section 31. The PSI supplied to the control section 31 is stored in the memory 32 of the control section 31.

The control section 31 supplies the value of the PID of the transport packet carrying "new EPG" to the storage-system PID filter 71. This value is set in advance and stored in the control section 31. By use of the given PID value, the storage-system PID filter 71 extracts the EPG information from the transport packet and supplies it to the control section 31. The supplied EPG information is stored in the memory 32.

The format of the EPG information used this time is as already described with reference to Table 1. The information supplied to the control section 31 is the organization data described with reference to FIG. 12 and the file name corresponding to the preloaded program.

The PSI and EPG information is included in each transport stream. In the receiving apparatus 3, the above-mentioned operation is always performed, always updating the PSI and EPG information. The PSI and EPG information is also updated during the provision (viewing/reproduction) of each preloaded program.

The control section 31 extracts/manipulates the EPG information as required or as instructed by the user not shown and instructs the OSD 43 to convert the resultant EPG information into a video signal. The video signal generated by the OSD 43 is mixed by the adding section 44 with the output signal from the video decoder 40, and the resultant signal is outputted to a television receiver not shown.

In step S54, the control section 31 reads the channel which was being viewed immediately before the last power-off operation from an internal non-volatile storage device not shown for example. The following description will be made by assuming that channel A was being viewed before the last power-off operation.

Immediately after a power-on operation, the receiving apparatus 3 controls so that "direct-transmitted channel" which was being viewed immediately before becomes viewable. Obviously, "direct" or "preloaded" channel which was being viewed immediately before a power-on operation may be displayed.

The control section 31 instructs the front end 35 to receive channel A. The front end 35 tunes in the frequency/band on which channel A is transmitted, demodulates the signal, performs error correction by use of error correction code, and outputs the resultant signal as a transport stream.

The transport stream outputted from the front end 35 is supplied to the PSI filter 36, the storage-system PID filter 71, the PCR PID filter 39, and the output PID filter 38 via the switch 75.

The control section 31 supplies the PID value of the transport packet carrying the video stream and the PID value of the transport packet carrying the audio stream to the output PID filter 38. The control section 31 supplies the PID value of the transport packet carrying PCR to the PCR PID filter 39. The pieces of PID information are those supplied from the PSI filter 36.

By use of the two given PID values, the output PID filter 38 extracts the video stream and the audio stream from the transport packet. The video stream is supplied to the video decoder 40 and the audio stream is supplied to the audio decoder 41.

The video decoder 40 converts the supplied MPEG2 video stream into a video signal and outputs the resultant signal, and the audio decoder 41 converts the supplied MPEG2-AAC audio stream into an audio signal to output the resultant signals.

By use of the supplied PID value, the PCR PID filter 39 extracts PCR from the transport packet and supplies it to the STC 42. The STC 42 synchronizes its clock with the supplied PCR. The internal clock generated by the PCR is used as a synchronous clock for the video decoder 40 and the audio decoder 41.

As described above, the PSI filter 36 extracts the PSI information from the inputted transport stream and supplies it to the control section 31, upon which the PSI stored in the memory 32 is updated. As described above, the storage-system PID filter 71 uses the given PID value to select a transport packet, extracts EPG data, and supplied the extracted EPG data to the control section 31. Thus, the EPG information stored in the memory 32 is updated.

In step S55, the control section 31 determines whether or not the viewer has operated the remote controller or the button (both not shown) to change the channel. If the channel is found changed by the user in step S55, then the procedure goes to step S59; otherwise, the procedure goes to step S56.

In step S56, the control section 31 determines whether or not the program currently outputted (decoded) is a preloaded program. If the currently outputted program is found a preloaded program in step S56, then the procedure goes to step S58; otherwise, the procedure goes to step S57.

In step S57, the control section 31 determines whether or not the user has turned off the power switch. It should be noted that the state in which the power switch is off in step S57 denotes the state in which the switch for performing a display operation is off. If the power switch is turned off in step S57, the video decoder 40 and audio decoder 41 stop outputting, upon which the procedure returns to step S51 to repeat the above-mentioned processing therefrom. On the other hand, if the power switch is found not turned off in step S57, the procedure returns to step S55 to repeat the above-mentioned processing therefrom.

On the other hand, if the channel change is found instructed by the user in step S55 and the procedure goes to step S59, the control section 31 determines whether or not the specified channel is a preloaded channel (in this case, channel B). If the specified channel is found a preloaded channel in step S59, the procedure goes to step S61 (FIG. 21); if the specified channel is found not a preloaded channel, namely if the specified channel is found a direct-transmitted channel (in this case, channel A), the procedure goes to step S60.

In step S60, the control section 31 instructs the front end 35 to receive the direct-transmitted channel corresponding to the specified channel. The transport stream outputted from the front end 35 as a result of the above-mentioned processing is processed in the same manner as the process of step S54, thereby outputting the data of the program corresponding to the newly selected channel. Then, the procedure returns to step S55 to repeat the above-mentioned processing therefrom.

On the other hand, if the specified channel is found a preloaded program channel in step S59 and the procedure goes to step S61 (FIG. 21), the control section 31 compares the EPG information stored in the memory 32 with the time indicated by the clock 33 to determine whether or not the preloaded program is currently provided in the specified preloaded program channel (in other words, in this case, whether or not it is 19:00 to 23:00, a viewable time zone). If the preloaded program is found provided, then the procedure goes to step S62; otherwise, the procedure goes to step S66.

If the user-specified preloaded channel is found provided, the control section 31 searches the information stored in the memory 32 for the file name of the currently provided preloaded program in step S62. To be more specific, the control section 31 checks the program guide for the user-specified preloaded channel at the time indicated by the clock 33 to find the associated file name.

The control section 31 determines whether or not the file concerned is recorded to the hard disk 73. If both the stream file ("*.pre") and the positional information file ("*.cpi") corresponding to the file concerned are found stored in the hard disk 73 in step S62, then the procedure goes to step S65. If only one or none of them is found stored, then the procedure goes to step S63.

If the file associated with the program corresponding to the user-specified channel is found stored in step S62 and the procedure goes to step S65, then the control section 31 instructs the front end 35 to receive the channel of channel A. In the present embodiment, as described above, it is set in advance that the information (for example, key information) associated with the preloaded program is supplied on the same frequency/band as channel A and the instruction is made to receive the channel of channel A in order to receive that information.

Also, the control section 31 causes the switch 75 to connect to the terminal a side to supply the output of the descrambler 74 to the output PID filter 38.

The front end 35 tunes in the frequency/band on which channel A is transmitted, demodulates the signal, performs error correction by use of error correction code, and outputs the data as a transport stream. The transport stream outputted from the front end 35 is supplied to the PSI filter 36, storage-system PID filter 71, and PCR PID filter 39.

The control section 31 supplies the PID value of the transport packet carrying the data stream to the storage-system PID filter 71. This value is determined in advance and stored in the control section 31. By use of the supplied PID value, the storage-system PID filter 71 extracts the data stream from the transport packet and supplies the data stream to the control section 31.

At supplying of the preloaded program, the data stream contains time and key data. At this moment, the format used is one of the formats described with reference to Table 3, namely the format with "command_flag" value set to "0000 1010." The control section 31 extracts the key from the time and key data and supplies the extracted key to the descrambler 74. Consequently, the stream file stored in the hard disk 73 in advance may be decrypted.

Next, the control section 31 checks the EPG information stored in the memory 32 for the start time of the program concerned. As shown below, the elapsed time from the beginning of the program concerned can be obtained by a difference between the start time of the program concerned and the current time indicated by the clock 33:

Elapsed time from the beginning of program=(current time)−(program start time)

The control section 31 reads positional information file "*.cpi" from the hard disk 73. The positional information file is the information which represents the positions of all intra-pictures of the stream file in combinations times and byte offsets in the sequence of their appearance as described before. The control section 31 searches for the intra-picture at a position to be displayed immediately after computed "elapsed time from the beginning of program", by use of a method such as binary search for example. This position is hereafter referred to as a reproduction position.

The control section 31 instructs the hard disk 73 to supply the data starting with the reproduction position of the file concerned to the descrambler 74. The descrambler 74 decrypts the stream file supplied from the hard disk 73 by use of the key supplied from the control section 31. The output from the descrambler 74 is supplied to the output PID filter 38 via the switch 75. The decrypted stream file is compliant with the format of transport stream.

The control section 31 supplies to the output PID filter 38 the PID value of the transport packet carrying the video stream and the PID value of the transport packet carrying the audio stream. These two values are predetermined for each preloaded stream file.

The output PID filter 38 extracts the video stream and the audio stream from the transport packets by use of the given two PID values. The video stream is supplied to the video decoder 40 and the audio stream is supplied to the audio decoder 41.

The video decoder 40 converts the supplied MPEG2 video stream into a video signal and outputs it. The audio decoder 41 converts the supplied MPEG2-AAC audio stream into an audio signal and outputs it.

The control section 31 supplies the PID value of the transport packet carrying PCR to the PCR PID filter 39. During supplying of each preloaded program, the transport stream carrying time and key data is carrying PCR, so that the same value as the PID of the data stream is set.

The PCR PID filter 39 extracts PCR from the transport packet by use of the given PID value and supplies the extracted PCR to the STC 42. The STC 42 synchronizes its clock with the inputted PCR. The internal clock generated by the STC 42 is used as a synchronous clock for the video decoder 40 and the audio decoder 41.

At this moment, the realtime PCR to be transmitted in the time and key data (the data stream) is different in value from the PTS of the stream file stored in the hard disk 73. Hence, by computing the difference between these values in advance, the video decoder 40 and the audio decoder 41 synchronizes the clock of video code/audio code with the value obtained by adding the computed difference to the PCR.

The PSI and EPG information is also updated during the provision of the preloaded program. Namely, the PSI filter 36 extracts the PSI information from the inputted transport stream and supplies the extracted PSI information to the control section 31. The supplied PSI is stored in the memory 32 of the control section 31.

The control section 31 supplies the PID value of the transport packet carrying "new EPG" to the storage-system PID filter 71. This value is predetermined and stored in the control section 31. By use of the given PID value, the storage-system PID filter 71 extracts EPG information from the transport packet and supplies it to the control section 31. The supplied EPG information is stored in the memory 32 of the control section 31.

The above-mentioned operations are executed as the process of step S65 and, when the preloaded program is provided to the viewer, the procedure returns to step S55 (FIG. 20) to repeat the above-mentioned processing therefrom.

On the other hand, if the preloaded program is found not being provided at the current time in step S61, in other words, if the current time is not 19:00 to 23:00 and the viewing of the preloaded program is not permitted, then the procedure goes to step S66, in which the control section 31 instructs the OSD 43 to generate a message "The preloaded program is not currently provided." The output signal of the OSD 43 is mixed by the adding section 44 with the output of the video decoder 40 and the resultant signal is outputted. When the above-mentioned processing comes to an end, the procedure goes to step S64.

It should be noted that the information associated with program provision such as preloading and direct-transmission need not be given to the viewer. Since giving such information may confuse or trouble the viewer, it is preferable to generate a message "Currently, no program is provided on the specified channel" for example, thereby not telling the viewer of such information as preloading and direct-transmission.

In step S64, the control section 31 provides the program of direct transmission channel viewed immediately before. The control section 31 instructs the front end 35 to receive the specified channel. Consequently, by processing the transport stream outputted from the front end 35 in the same manner as described above in step S54, the display of the program viewed at instructing the channel change is started again. When the above-mentioned processing comes to an end, the procedure returns to step S55 (FIG. 20) to repeat the above-mentioned processing therefrom.

On the other hand, if the file of the program corresponding to the specified channel is found not stored in the hard disk 73 in step S62, then the procedure goes to step S66, in which the control section 31 instructs the OSD 43 to generate message "The program cannot be viewed because its file has not been loaded" for example. The output signal of the OSD 43-is mixed by the adding section 44 with the output of the video decoder 40 and the resultant signal is outputted. Like the above-mentioned message generated in step S63, it is preferable to generate the message in step S66 so that the viewer need not recognize the difference between preloading and direct transmission.

On the other hand, if the preloaded program is found being decoded in step S56 (FIG. 20), then the procedure goes to step S58 to determine whether or not the program being provided (decoded) has come to an end. For example, because program X is provided between 19:00 and 21:00, the program being provided is determined ended when 21:00 has been reached and determined not ended before 21:00 in step S58.

Figure 21:
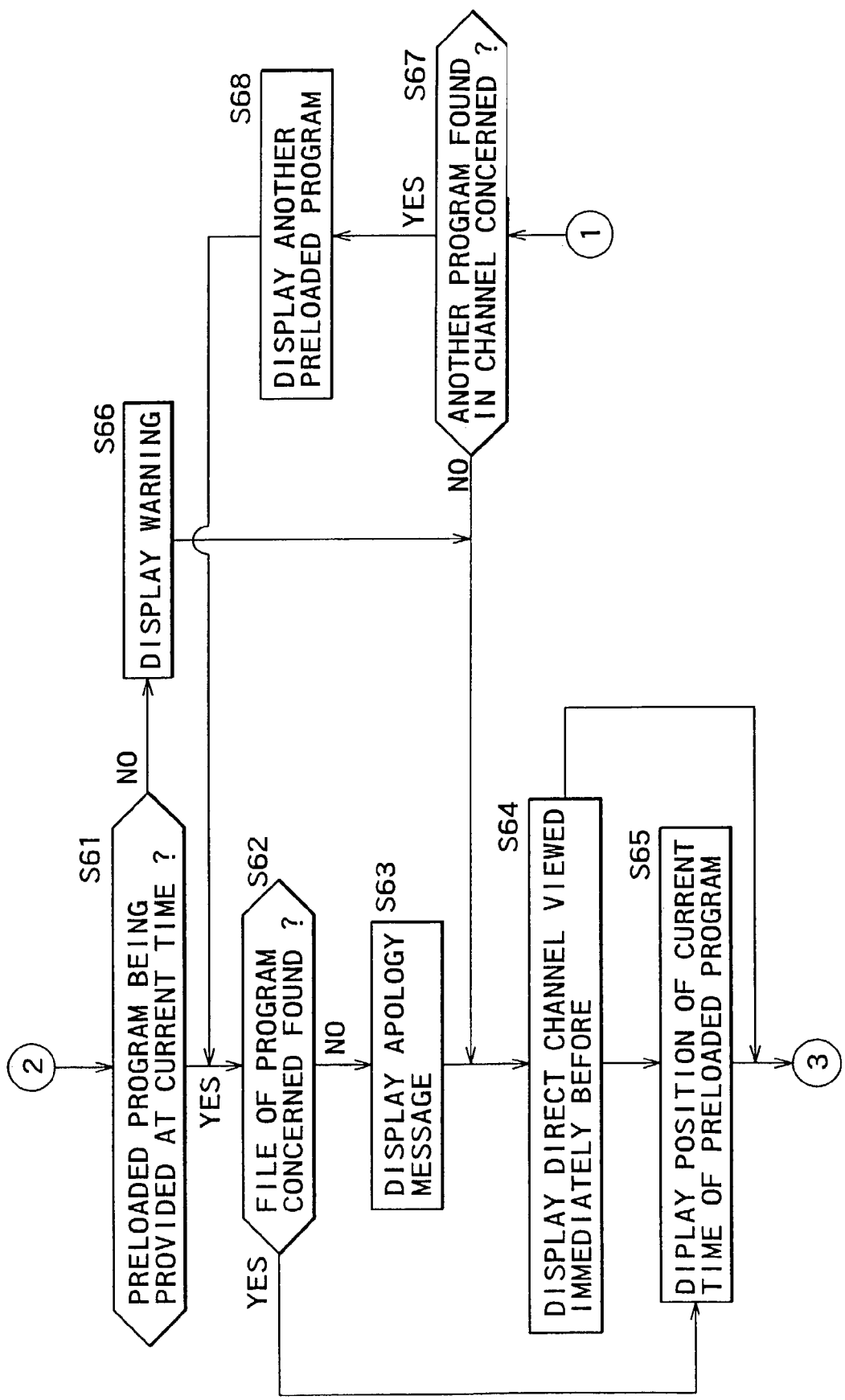
FIG. 21 is a flowchart continued from the flowchart shown in FIG. 20.

Therefore, if the program being provided is found not ended in step S58, the procedure returns to step S55 to repeat the processing therefrom until the end is detected. When the program is found ended, the procedure goes to step S67 (FIG. 21). It should be noted that the process in step S58 is performed by checking whether or not the program outputted by the hard disk 73 instructed by the control section 31 by means of the EPG data stored in the memory 32, thereby determining whether or not the time indicated by the clock 33 indicates the broadcasting of the program concerned or the end of broadcasting (the end of provision).

In step S67, the control section 31 checks the channel on which the program concerned is being provided by referencing the EPG information recorded to the memory 32 to determine whether or not the channel concerned has next "preloaded program." If a next program is found, then the procedure goes to step S68; if a next program is not found, the procedure goes to step S64. The processing to be performed from step S64 has already been described and therefore its description will be skipped.

In this case, if the process of step S67 is executed when the program X is being provided on channel B, the procedure goes to step S68 because there is program Y. If the process of step S67 is executed when program Y is being provided, the procedure goes to step S64 because there is no program to be provided next, in which the channel is switched to the direct-transmitted program viewed immediately before the preloaded program X is viewed.

In step S68, the control section 31 determines the preloaded program to be broadcast next on the channel concerned on the basis of the EPG information stored in the memory 32 and the time indicated by the clock 33. The processing from step S62 is executed on the determined program. Controlling the display as described above allows the switching between direct-transmitted program and preloaded program as if it were, for the viewer, the switching between two direct-transmitted channels.

The following describes the further details of the time and key data described above with reference to Table 3. The data associated with date and time (year, month, day, hour, minute, and second) and the PTS for these data are used to correct the time of the clock 33. Namely, the moment at which the PTS added to the date information concerned becomes equal to the STC synchronized with the PCR added and inputted to the transport stream of the time and key data is the moment indicated by the date information concerned.

The control section 31 rewrites the information of the clock 33 by the inputted date information concerned at that moment to match the clock 33 with the clock 13 of the transmitting apparatus 1 (FIG. 8). It should be noted that this task is not performed every time; it is performed once a day for example.

The information associated with file name (len_filename, filename_data) may be used in the process of step S62 for obtaining the file name, instead of checking the EPG information stored in the memory 32.

In addition, start time (start_time_hour, start_time_min) and program length (length_hour, length_min) may be used for the checking in the process of step S61 and for the computation of elapsed time in step S65.

Figure 22:
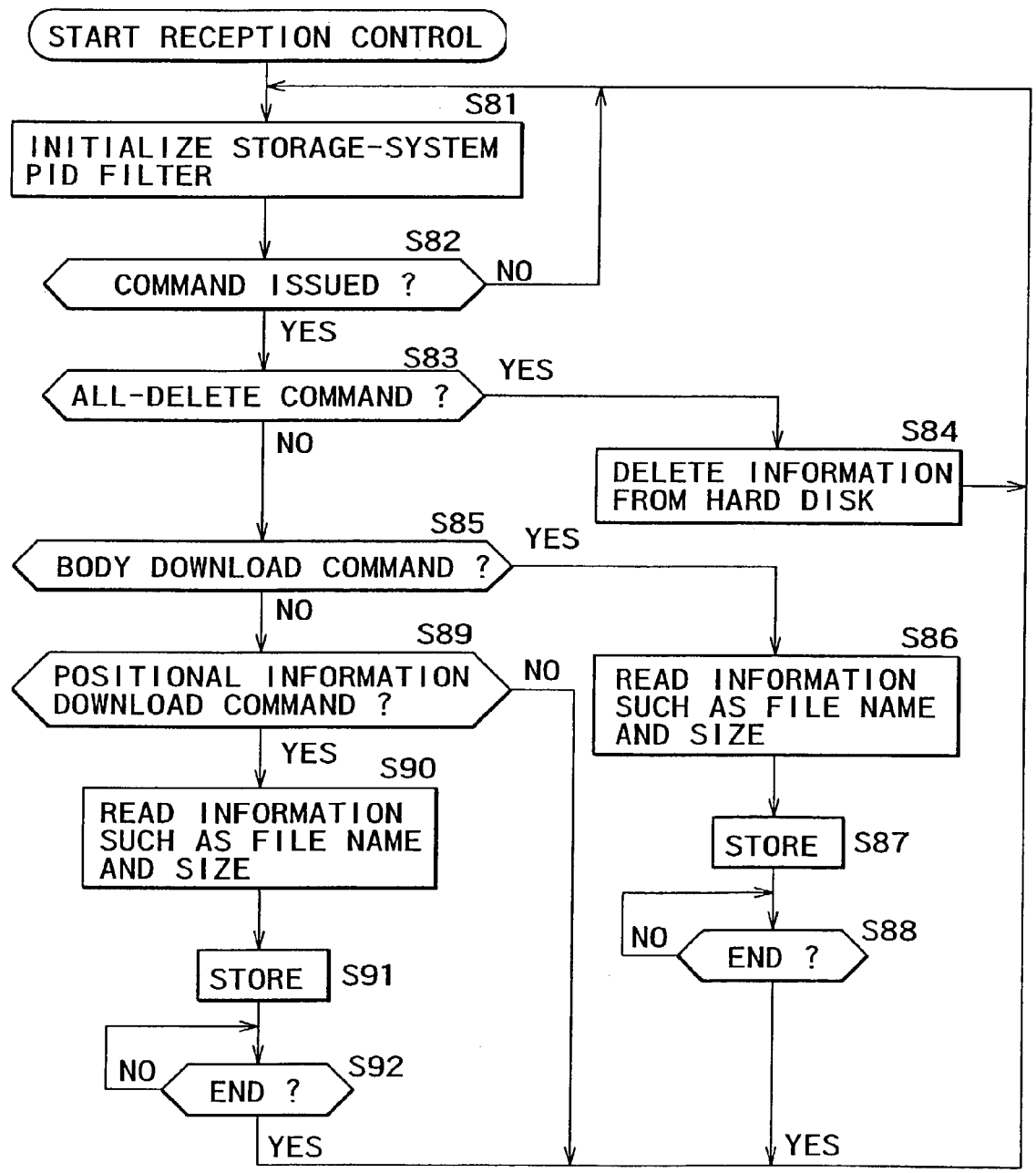
FIG. 22 is a flowchart describing an operation to be executed when the receiving apparatus 3 receives preloaded program data.

The receiving apparatus 3 performs the above-mentioned display control as well as the control of receiving the data of each preloaded program. The following describes the operation of the receiving apparatus 3 associated with the reception of the data of each preloaded program with reference to the flowchart shown in FIG. 22.

In step S81, the control section 31 supplies the PID value of the transport packet carrying the control stream to the storage-system PID filter 71. This value is predetermined and stored in the control section 31. The storage-system PID filter 71 extracts the control stream information from the transport packet by use of the supplied PID value and supplies the extracted information to the control section 31. The information included in the control stream is any of the control commands described before with reference to Table 2.

In step S82, the control section 31 monitors the control stream supplied from the storage-system PID filter 71. The process of step S82 is repeated until the control stream command is found supplied. When the control stream command is found supplied, the procedure goes to step S83.

In the processing of step S83 and the following steps, the supplied command is analyzed and process corresponding to the result of the analysis is executed. The control command has the structure as shown in Table 2. First, in step S83, it is determined whether or not the supplied command is an all-delete command. This determination is made by checking command_flag of the first 8 bits by the control section 31 which has received this command. If the value of command_flag is "0000 0001," it indicates an all-delete command.

If the supplied command is found an all-delete command in step S83, then the procedure goes to step S84. In step S84, the control section 31 which has received the all-delete command instructs the hard disk 73 to delete "stream file" ("*.pre") and "positional information file" ("*.cgi") from the hard disk 73. When this processing comes to an end, the procedure returns to step S82 to wait for another command.

On the other hand, if the supplied command is found not an all-delete command in step S83, then the procedure goes to step S85 to determine whether or not the supplied command is a body download command. If the value of command_flag is "0000 0010," it indicates a body download command. If the supplied command is found a body download command in step S85, the procedure goes to step S86.

In step S86, receiving the body download command, the control section 31 reads the file name (len_filename, filename_data) and the file size (size) from the received command. The file name is suffixed with ".pre", indicating a stream file.

In step S87, the control section 31 specifies "file name" and "file size" to the hard disk 73 and instructs it to store the stream file supplied from the data extracting section 72 in the specified file name.

The control section 31 supplies the PID value of the transport packet carrying the stream file to the storage-system PID filter 71. This value is predetermined and stored in the control section 31. By use of the supplied PID value, the storage-system PID filter 71 extracts the stream file from the transport packet and supplies the extracted stream file to the data extracting section 72.

At the time of preloading of a preloaded program, the data stream uses the download data format. The format to be used is one of the formats described with reference to Table 3, the value of command_flag being "0000 1001." The data extracting section 72 removes the command_flag which is the beginning of the structure of the download data shown in Table 3, extracts data_byte by use of next num_of_data, and supplies the extracted data_byte to the hard disk 73. The stuffing_byte is also removed.

The hard disk 73 stores the data supplied with the specified name from the control section 31. When the supplied data have reached the size specified in "file size," the hard disk 73 sends to the control section 31 a signal telling the end of data loading.

In step S88, the control section 31 determined whether or not the signal telling the end of recording has been inputted from the hard disk 73 and repeats the process of step S88 until the signal is found inputted. If the signal telling the end of recording is found inputted, the processing of step S82 and the following steps are repeated on the inputted command.

On the other hand, if the inputted command is found not a body download command in step S85, then the procedure goes to step S89. In step S89, if the inputted command is found not a positional information download command, then procedure returns to step S82 to repeat the above-mentioned processing therefrom. In this case, if the inputted command is found not a positional information download command, it indicates that the inputted command is an invalid command.

If the inputted command is found a positional information download command in step S89, then the procedure goes to step S90. The processes of steps S90 through S92 are executed in the same manner as those of steps S86 through S88, so that their descriptions will be skipped appropriately.

In step S91, the control section 31 specifies "file name" and "file size" to the hard disk 73 to instruct it to store the positional information file supplied from the data extracting section 72 in the specified name.

At the time of preloading of the preloaded program, the data stream uses the format of the download data format. The format used at this time is one of the formats described with reference to Table 3, of which command_flag value is "0000 1001."

In step S92, the control section 31 continues the state of waiting for the signal telling the end of recording from the hard disk 73 as described in step S88 and, when the signal telling the end of recording is inputted, the procedure returns to step S82 to repeat the above-mentioned processing therefrom.

Thus, the reception control is performed on the data of preloaded programs and, at the same time, in the receiving apparatus 3, the above-mentioned display control is performed.

Application of the present invention apparently increases the number of channels in the prime time, thereby widening the channel selection range in time zones desired by viewers. This does not, however, trouble viewers by increasing the number of processes for example. In addition, the data of program body stored in the hard disk 73 may be encrypted to reliably ensure copyright protection for example.

In the above-mentioned embodiment, preloaded programs and direct-transmitted programs are classified on a channel basis into preloaded channels and direct-transmitted channels. Alternatively, preloaded programs and direct-transmitted programs may coexist in a single channel on a program basis or in units smaller than the program.

In the above-mentioned embodiment, the band diverted to the prime time is used to increase the number of programs. Alternatively, this diversion may be made to enhance the picture quality of programs. Namely, in the direct-transmission portion, a bit stream of normal picture quality is transmitted while, in the preloading portion, a bit stream of enhanced picture quality is transmitted.

It is also practicable to transmit a flag indicative of whether or not a stream file of preloaded program can be reproduced in a special manner to determine whether or not reproduce this file in a special manner on the receiving apparatus 3 side, thereby reproducing the file in a special manner if it is enabled.

In the above-mentioned embodiment, the data of preloaded programs are transmitted from the transmitting apparatus 1. Alternatively, these data may be transmitted via a network such as the Internet. Alternatively still, these data may be distributed in a recording medium such as CD-ROM. Copyright protection may also be ensured by the transmission (or distribution) of the data of preloaded programs if the key data are provided only at a predetermined time as with the present embodiment.

The above-mentioned sequence of processes may be executed by hardware as well as by software. To execute the above-mentioned processing by software, a computer in which the programs constituting the software are assembled in a dedicated hardware device is used or the program is installed from the recording media into a general-purpose personal computer which can execute various capabilities by installing various programs.

FIG. 23 illustrates an exemplary internal configuration of a general-purpose personal computer. A CPU (Central Processing Unit) 101 executes various processes as instructed by programs stored in a ROM (Read Only Memory) 102. A RAM (Random Access Memory) 103 appropriately stores data and programs necessary for the CPU 101 to execute various processes. An input/output interface 105 is connected to an input section 106 constituted by a keyboard and a mouse for example to output signals inputted through the input section 106 to the CPU 101. The input/output interface 105 is also connected to an output section 107 constituted by a display and a speaker for example.

In addition, the input/output interface 105 is connected to a storage section 108 constituted by a hard disk for example and a communication section 109 for transferring data with other devices via a network such as the Internet. A drive 110 is used to read data from and write data to recording medium such as a magnetic disk 121, an optical disk 122, a magneto-optical disk 123, or a semiconductor memory 124.

The recording media are constituted not only by package media storing programs such as the magnetic disk 121 (including a floppy disk), the optical disk 122 (including CD-ROM (Compact Disk-Read Only Memory) and a DVD (Digital Versatile Disk)), and the magneto-optical disk 123 (including MD (Mini Disk) (trademark)), and the semiconductor memory 124 which are distributed to users to provide the programs independently of personal computers as shown in FIG. 23, but also by a hard disk including the ROM 102 and the storage section 108 storing programs to be provided to users as installed in computers in advance.

It should be noted that the steps for describing programs provided by recording media include not only the processing operations which are executed in a time dependent manner in the order described, but also the processing operations which are executed in parallel to each other or discretely from each other.

It should also be noted that term system as used herein denotes an entire apparatus constituted by two or more components.

INDUSTRIAL APPLICABILITY

As described and according to the invention, in the transmitting apparatus and method and the first program, inputted data are encrypted by use of a predetermined key, the encrypted data are transmitted in a predetermined time zone, and the key is transmitted after the predetermined time zone to enable the viewing of a program on the receiving side at a time intended by the transmitting side, thereby providing programs by the effective use of band.

As described and according to the invention, in the receiving apparatus and method and the second program, by use of a transmission channel for transmitting the data of a first program of a first channel, the encrypted program data transmitted in a predetermined time zone are received to be stored as the data of a second program of a second channel, a key for decrypting the program data transmitted after the predetermined time zone and at the time of viewing the second program on the receiving side intended by the transmitting side is received, the data of the second program are decrypted by the received key, and the stored data of the second program are decoded for reproduction, thereby increasing the number of channels selectable by viewers.

As described and according to the invention, in the information transmitting/receiving system and method and the third program, the transmitting apparatus encrypts program data by use of a predetermined key, transmits the encrypted data to the receiving apparatus in a predetermined time zone, and transmits the key to the receiving apparatus after the predetermined time zone and at the time of viewing the program on the receiving side intended by the transmitting apparatus; and receiving apparatus receives the transmitted program data to store them, decodes the stored program data by use of the received key to reproduce the program at a viewing time on the receiving apparatus side intended by the transmitting apparatus, thereby allowing the effective use of band for transmission and the increase in the number of channels for users.

What is claimed is:

1. A transmitting apparatus comprising:
  input means for inputting data of a second program;
  encrypting means for encrypting said data inputted from said input means by use of a predetermined key;
  detecting means for detecting a position of an intra-picture from said data, wherein the position of the intra-picture is detected as a time offset and a byte offset from the beginning of a bit stream, wherein the time offset and the byte offset are encrypted with said data;
  first transmitting means for transmitting data of a first program and data of the second program encrypted by said encrypting means;
  second transmitting means for transmitting said key at a time for enabling said second program to be viewed on a receiving apparatus at a viewing time established by the transmitting apparatus, wherein said first program is viewed at a time when said data of said first program is received by said receiving apparatus, wherein said second program is viewed at a time when said key is received by said receiving apparatus and after a predetermined time slot when the data of said second program is transmitted, and wherein said first program and said second program are viewed in the same viewing time slot.

2. The transmitting apparatus according to claim 1, wherein said predetermined time slot is in a time zone with a lower audience rating than another time zone.

3. The transmitting apparatus according to claim 1, further comprising:
  creating means for creating associating information for associating a position of said intra-picture detected by said detecting means with an elapsed time from a starting time of said second program;
  wherein said first transmitting means transmits said associating information along with said encrypted data.

4. The transmitting apparatus according to claim 1, wherein said first transmitting means, by use of a transmission channel for transmitting data of a first program to be viewed by a viewer in a first program channel, transmits, in said predetermined time slot, data of a second program to be viewed by said viewer in a second program channel; and
  said second transmitting means transmits said key by use of a same transmission channel as said transmission channel to be used by said first transmitting means.

5. The transmitting apparatus according to claim 4, further comprising:
  first generating means for generating a first Electric Program Guide (EPG) associated with both said first program and said second program; and second generating means for generating a second Electric Program Guide (EPG) associated with said second program;

wherein said first Electric Program Guide (EPG) includes a flag indicative of said first program or said second program.

6. A transmitting method comprising:

an encrypting step for encrypting second program data by use of a key;

a detecting step for detecting a position of an intra-picture from said second program data, wherein the position of the intra-picture is detected as a time offset and a byte offset from the beginning of a bit stream, wherein the time offset and the byte offset are encrypted with said data;

transmitting data of a first program and data of a second program encrypted by said encrypting step;

transmitting said key at a time for enabling said second program to be viewed on a receiving apparatus at a viewing time established by a transmission apparatus, wherein said first program is viewed at a time when said data of said first program is received by said receiving apparatus, wherein said second program is viewed at a time when said key is received by said receiving apparatus and after a predetermined time slot when the data of said second program is transmitted, and wherein said first program and said second program are viewed in the same viewing time slot.

7. A recording medium storing a computer program executed by a processor, said computer program comprising:

an encrypting step for encrypting second program data by use of a predetermined key;

a detecting step for detecting a position of an intra-picture from said second program data, wherein the position of the intra-picture is detected as a time offset and a byte offset from the beginning of a bit stream, wherein the time offset and the byte offset are encrypted with said data;

a first transmitting step of transmitting data of a first program and data of a second program encrypted by said encrypting step;

a second transmitting step for transmitting said key at a time for enabling said second program to be viewed on a receiving apparatus at a viewing time established by a transmitting apparatus, wherein said first program is viewed at a time when said data of said first program is received by said receiving apparatus, wherein said second program is viewed at a time when said key is received by said receiving apparatus and after a predetermined time slot when the data of said second program is transmitted, and wherein said first program and said second program are viewed in the same viewing time slot.

8. A system comprising:

at least one processor; and at least one memory coupled to the at least one processor, the memory storing a computer program comprising:

an encrypting step for encrypting second program data by use of a predetermined key;

a detecting step for detecting a position of an intra-picture from said second program data, wherein the position of the intra-picture is detected as a time offset and a byte offset from the beginning of a bit stream, wherein the time offset and the byte offset are encrypted with said data;

a first transmitting step of transmitting data of a first program and data of a second program encrypted by said encrypting step;

a second transmitting step for transmitting said key at a time for enabling said second program to be viewed on a receiving apparatus at a viewing time established by a transmitting apparatus, wherein said first program is viewed at a time when said data of said first program is received by said receiving apparatus, wherein said second program is viewed at a time when said key is received by said receiving apparatus and after a predetermined time slot when the data of said second program is transmitted, and wherein said first program and said second program are viewed in the same viewing time slot.

9. A receiving apparatus comprising:

storage means for receiving and storing, as data of a second program of a second program channel, encrypted the second program data supplied in a predetermined time slot by use of a transmission channel that transmits data of a first program of a first program channel;

detecting means for detecting a position an intra-picture from said second program data, wherein the position of the intra-picture is detected as a time offset and a byte offset from the beginning of a bit stream, wherein the time offset and the byte offset are encrypted with said data;

receiving means for receiving a key for decrypting said second program data, said key being transmitted after said predetermined time slot and at a time for enabling the viewing, on the receiving side, of said second program at a viewing time established by a transmitting apparatus; and reproducing means for reproducing said second program by decrypting said data of said second program stored in said storage means by use of said key received by said receiving means, wherein said first program is viewed at a time when said data of said first program is received by said receiving apparatus, wherein said second program is viewed at a time when said key is received by said receiving apparatus and after a predetermined time slot when the data of said second program is transmitted, and wherein said first program and said second program are viewed in the same viewing time slot.

10. A receiving method comprising:

a storage control step from controlling the reception of encrypted second program data supplied in a predetermined time slot by use of a transmission channel for transmitting data of a first program of a first program channel and controlling the storage of the supplied data as data of a second program of a second program channel;

a detecting step for detecting a position an intra-picture from said second program data, wherein the position of the intra-picture is detected as a time offset and a byte offset from the beginning of a bit stream, wherein the time offset and the byte offset are encrypted with said data;

a reception control step for controlling the reception of a key for decrypting said second program data, said key being transmitted after said predetermined time slot and at a time for enabling the viewing, on a receiving apparatus, of said second program at a viewing time established by a transmitting apparatus; and a reproducing step for reproducing said second program by decrypting said data of said second program in which the storage is controlled in said storage control step by use of said key received by said reception control step, wherein said first program is viewed at a time when said data of said first program is received by said receiving apparatus, wherein said second program is viewed at a time when said key is received by said receiving apparatus and after a predetermined time slot when the data of said second program is transmitted, and wherein said first program and said second program are viewed in the same viewing time slot.

11. A recording medium storing a computer program executed by a processor, said computer program comprising:

a storage control step from controlling the reception of encrypted second program data supplied in a predetermined time slot by use of a transmission channel for transmitting data of a first program of a first program channel and controlling the storage of the supplied data as data of a second program of a second program channel;

a detecting step for detecting a position an intra-picture from said second program data, wherein the position of the intra-picture is detected as a time offset and a byte offset from the beginning of a bit stream, wherein the time offset and the byte offset are encrypted with said data;

a reception control step for controlling the reception of a key for decrypting said second program data, said key being transmitted after said predetermined time slot and at a time for enabling the viewing, on a receiving apparatus, of said second program at a viewing time established by a transmitting apparatus; and a reproducing step for reproducing said second program by decrypting said data of said second program in which the storage is controlled in said storage control step by use of said key received by said reception control step, wherein said first program is viewed at a time when said data of said first program is received by said receiving apparatus, wherein said second program is viewed at a time when said key is received by said receiving apparatus and after a predetermined time slot when the data of said second program is transmitted, and wherein said first program and said second program are viewed in the same viewing time slot.

12. A system comprising:

at least one processor; and at least one memory coupled to the at least one processor, the memory storing a computer program comprising:

a storage control step for controlling the reception of encrypted second program data supplied in a predetermined time slot by use of a transmission channel for transmitting data of a first program of a first program channel and controlling the storage of the supplied data as data of a second program of a second program channel;

a detecting step for detecting a position of an intra-picture from said second program data, wherein the position of the intra-picture is detected as a time offset and a byte offset from the beginning of a bit stream, wherein the time offset and the byte offset are encrypted with said data;

a reception control step for controlling the reception of a key for decrypting said second program data, said key being transmitted after said predetermined time slot and at a time for enabling the viewing, on a receiving apparatus, of said second program at a viewing time established by a transmitting apparatus; and a reproducing step for reproducing said second program by decrypting said data of said second program in which the storage is controlled in said storage control step by use of said key received by said reception control step, wherein said first program is viewed at a time when said data of said first program is received by said receiving apparatus, wherein said second program is viewed at a time when said key is received by said receiving apparatus and after a predetermined time slot when the data of said second program is transmitted, and wherein said first program and said second program are viewed in the same viewing time slot.

13. An information transmitting/receiving system having a transmitting apparatus for transmitting data and a receiving apparatus for receiving said data transmitted from said transmitting apparatus, said transmitting apparatus comprising:

encrypting means for encrypting data of a second program by use of a predetermined key;

detecting means for detecting a position of an intra-picture from said second program data, wherein the position of the intra-picture is detected as a time offset and a byte offset from the beginning of a bit stream, wherein the time offset and the byte offset are encrypted with said data;

first transmitting means for transmitting data of a first program and data of a second program encrypted by said encrypting means;

second transmitting means for transmitting said key at a time for enabling said second program to be viewed on the receiving apparatus at a viewing time established by the transmitting apparatus, said receiving apparatus comprising:

storage means for receiving and storing said data of said second program transmitted from said first transmitting means;

receiving means for receiving said key transmitted from said second transmitting means; and reproducing means for reproducing said second program at a viewing time on said receiving apparatus established by said transmitting apparatus by decoding said data of said second program stored in said storage means by use of said key received by said receiving means, wherein said first program is viewed at a time when said data of said first program is received by said receiving apparatus, wherein said second program is viewed at a time when said key is received by said receiving apparatus and after a predetermined time slot when the data of said second program is transmitted, and wherein said first program and said second program are viewed in the same viewing time slot.

14. An information transmitting/receiving method for an information transmitting/receiving system having a transmitting apparatus for transmitting data and a receiving apparatus for receiving said data transmitted from said transmitting apparatus, the information transmitting/recording method for said transmitting apparatus comprising:

an encrypting step for encrypting data of a second program by use of a predetermined key;

a detecting step for detecting a position an intra-picture from said second program data, wherein the position of the intra-picture is detected as a time offset and a byte offset from the beginning of a bit stream, wherein the time offset and the byte offset are encrypted with said data;

a first transmitting step for transmitting data of a first program and data of a second program encrypted by said encrypting step;

a second transmitting step for transmitting said key at a time for enabling said second program to be viewed on the receiving apparatus at a viewing time established by the transmitting apparatus, the information transmitting/receiving method for said receiving apparatus comprising:

a storage control step for controlling the reception and storage of said data of said second program in which the transmission is controlled in said first transmission step;

a reception control step for controlling the reception of said key in which the transmission is controlled in said second transmission step; and a reproducing step for reproducing said second program at a viewing time on said receiving apparatus intended by said transmitting apparatus by decoding said data of said second program in which the storage is controlled in said storage control step by use of said key in which the reception is controlled in said reception control step, wherein said first program is viewed at a time when said data of said first program is received by said receiving apparatus, wherein said second program is viewed at a time when said key is received by said receiving apparatus and after a predetermined time slot when the data of said second program is transmitted, and wherein said first program and said second program are viewed in the same viewing time slot.

15. A recording medium storing a computer program, executed by a processor, for an information transmitting/receiving system having a transmitting apparatus for transmitting data and a receiving apparatus for receiving said data transmitted from said transmitting apparatus, the computer program including a computer program for said transmitting apparatus and a computer program for said receiving apparatus, wherein, said computer program for said transmitting apparatus comprising:

an encrypting step for encrypting data of a second program by use of a predetermined key; a detecting step for detecting a position of an intra-picture from said second program data, wherein the position of the intra-picture is detected as a time offset and a byte offset from the beginning of a bit stream, wherein the time offset and the byte offset are encrypted with said data; a first transmitting step for transmitting data of a first program and data of a second program encrypted by said encrypting step;

a second transmitting step for transmitting said key at a time for enabling said second program to be viewed on the receiving apparatus at a viewing time established by the transmitting apparatus, said computer program for said receiving apparatus comprising:

a storage control step for controlling the reception and storage of said data of said second program in which the transmission is controlled in said first transmission step; a reception control step for controlling the reception of said key in which the transmission is controlled in said second transmission step; and a reproducing step for reproducing said second program at a viewing time on said receiving apparatus intended by said transmitting apparatus by decoding said data of said second program in which the storage is controlled in said storage control step, by use of said key in which the reception is controlled in said reception control step, wherein said first program is viewed at a time when said data of said first program is received by said receiving apparatus, wherein said second program is viewed at a time when said key is received by said receiving apparatus and after a predetermined time slot when the data of said second program is transmitted, and wherein said first program and said second program are viewed in the same viewing time slot.

16. A system comprising:

at least one processor; and at least one memory coupled to the at least one processor, the memory storing a computer program for an information transmitting/receiving system having a transmitting apparatus for transmitting data and a receiving apparatus for receiving said data transmitted from said transmitting apparatus, the computer program including a computer program for said transmitting apparatus and a computer program for said receiving apparatus, wherein, said computer program for said transmitting apparatus comprising:

an encrypting step for encrypting data of a second program by use of a predetermined key;

a detecting step for detecting a position of an intra-picture from said second program data, wherein the position of the intra-picture is detected as a time offset and a byte offset from the beginning of a bit stream, wherein the time offset and the byte offset are encrypted with said data;

a first transmitting step for transmitting data of a first program and data of a second program encrypted by said encrypting step;

a second transmitting step for transmitting said key at a time for enabling said second program to be viewed on the receiving apparatus at a viewing time established by the transmitting apparatus, said computer program for said receiving apparatus comprising:

a storage control step for controlling the storage of said data of said second program in which transmission is controlled in said first transmission step;

a reception control step for controlling the reception of said key in which the transmission is controlled in said second transmission step; and a reproducing step for reproducing said second program at a viewing time on said receiving apparatus intended by said transmitting apparatus by decoding said data of said second program stored in said storage control step by use of said key received by said reception control step, wherein said first program is viewed at a time when said data of said first program is received by said receiving apparatus, wherein said second program is viewed at a time when said key is received by said receiving apparatus and after a predetermined time slot when the data of said second program is transmitted, and wherein said first program and said second program are viewed in the same viewing time slot.

* * * * *